US010175395B2

(12) United States Patent
Bleier et al.

(10) Patent No.: US 10,175,395 B2
(45) Date of Patent: *Jan. 8, 2019

(54) MOUNT FOR AN OPTICAL STRUCTURE HAVING A GROOVED PROTRUDING MEMBER AND METHOD OF MOUNTING AN OPTICAL STRUCTURE USING SUCH MOUNT

(71) Applicant: PLX, Inc., Deer Park, NY (US)

(72) Inventors: Zvi Bleier, Melville, NY (US); Itai Vishnia, Setauket, NY (US)

(73) Assignee: PLX, Inc., Deer Park, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,843

(22) Filed: Sep. 20, 2017

(65) Prior Publication Data

US 2018/0011230 A1      Jan. 11, 2018

Related U.S. Application Data

(62) Division of application No. 13/036,506, filed on Feb. 28, 2011, now Pat. No. 9,798,051.

(51) Int. Cl.
*G02B 7/182* (2006.01)
*G02B 5/122* (2006.01)
*G02B 7/00* (2006.01)

(52) U.S. Cl.
CPC ............ *G02B 5/122* (2013.01); *G02B 7/006* (2013.01); *G02B 7/182* (2013.01); *G02B 7/1825* (2013.01)

(58) Field of Classification Search
CPC ....... G02B 5/122; G02B 7/182; G02B 7/1825
(Continued)

(56) References Cited

U.S. PATENT DOCUMENTS

| 2,626,771 A | 1/1953 | Krohm |
| 3,310,264 A | 3/1967 | Appleton |

(Continued)

FOREIGN PATENT DOCUMENTS

| WO | 2007120476 A2 | 10/2007 |
| WO | 2013078281 A2 | 5/2013 |

OTHER PUBLICATIONS

"Office Action" for U.S. Appl. No. 13/777,267, dated Sep. 13, 2013.
(Continued)

*Primary Examiner* — Ricky D Shafer
(74) *Attorney, Agent, or Firm* — Kaplan Breyer Schwarz, LLP

(57) ABSTRACT

An improved mount for, and method of mounting, an optical structure having a grooved/relieved protruding member is provided. The mount may have the grooved/relieved protruding member extending from a surface of the optical structure, a base element for mounting the mount to another structure and an upper element extending from the base element having a first opening extending therethrough for receipt therein of at least a portion of the grooved/relieved member. The first opening defines first and second arms, each of the arms comprising a head portion and each of the head portions ending at an end. A second opening in the upper element extends through one of the head portions and the end thereof in a direction toward the other head portion, while a third opening exists in the upper element through the end of the other head portion in an orientation substantially opposite to and in communication with the second opening so that a tightening mechanism may be received through the second opening and the third opening. Tightening of the tightening mechanism into the third opening causes the ends of the head portions to draw toward each other so that the
(Continued)

first opening of the upper element tightens around the at least a portion of the grooved/relieved protruding member.

19 Claims, 15 Drawing Sheets

(58) Field of Classification Search
USPC .............. 359/850, 855, 856, 857, 871, 900
See application file for complete search history.

(56) References Cited

U.S. PATENT DOCUMENTS

| | | |
|---|---|---|
| 3,526,381 A | 9/1970 | Pepe |
| 3,663,084 A | 5/1972 | Lipkins |
| 3,832,072 A | 8/1974 | Mazur |
| 3,977,765 A | 8/1976 | Lipkins |
| 4,025,792 A | 5/1977 | Harries |
| 4,193,693 A | 3/1980 | Schindler et al. |
| 4,383,205 A | 5/1983 | Guisinger |
| 4,383,762 A | 5/1983 | Burkert |
| 4,479,625 A | 10/1984 | Martz |
| 4,556,316 A | 12/1985 | Doyle |
| 4,635,887 A | 1/1987 | Hall et al. |
| 4,657,361 A * | 4/1987 | Eitel ................... G02B 7/182 248/467 |
| 4,710,001 A | 12/1987 | Lacey |
| 4,773,757 A | 9/1988 | Doyle |
| 4,810,092 A | 3/1989 | Auth |
| 4,815,836 A | 3/1989 | Byers et al. |
| 4,914,297 A | 4/1990 | Wieboldt et al. |
| 4,915,502 A | 4/1990 | Brierley |
| 4,918,306 A | 4/1990 | Saito |
| 4,991,961 A | 2/1991 | Strait |
| 5,002,394 A | 3/1991 | Auth |
| 5,024,514 A | 6/1991 | Bleier et al. |
| 5,122,901 A | 6/1992 | Bleier |
| 5,196,902 A | 3/1993 | Solomon |
| 5,239,361 A | 8/1993 | Burch |
| 5,335,111 A | 8/1994 | Bleier |
| 5,349,438 A | 9/1994 | Solomon |
| 5,361,171 A | 11/1994 | Bleier |
| 5,440,143 A | 8/1995 | Carangelo et al. |
| 5,486,917 A | 1/1996 | Carangelo et al. |
| 5,521,698 A | 5/1996 | Carroll et al. |
| 5,543,916 A | 8/1996 | Kachanov |
| 5,589,991 A | 12/1996 | Bleier |
| 5,610,706 A | 3/1997 | Carroll et al. |
| 5,678,409 A | 10/1997 | Price |
| 5,808,739 A | 9/1998 | Turner et al. |
| 5,861,956 A | 1/1999 | Bridges et al. |
| 5,949,543 A | 9/1999 | Bleier et al. |
| 5,949,544 A | 9/1999 | Manning |
| 6,062,697 A | 5/2000 | Bryant et al. |
| 6,141,101 A | 10/2000 | Bleier et al. |
| 6,246,052 B1 | 6/2001 | Cleveland et al. |
| 6,302,585 B1 | 10/2001 | Lee et al. |
| 6,402,330 B1 | 6/2002 | Scheidegg |
| 6,453,566 B1 | 9/2002 | Bottinelli et al. |
| 6,473,185 B2 | 10/2002 | Vishnia et al. |
| 6,639,742 B2 | 10/2003 | Snively et al. |
| 6,657,196 B2 | 12/2003 | Endo et al. |
| 6,729,735 B2 | 5/2004 | Bleier |
| 6,752,503 B2 | 6/2004 | Bleier |
| 6,786,608 B1 | 9/2004 | Bleier |
| 6,827,455 B2 | 12/2004 | Bleier |
| 6,836,968 B1 | 1/2005 | Walker et al. |
| 6,940,598 B2 | 9/2005 | Christel et al. |
| 6,945,661 B2 | 9/2005 | Bleier |
| 7,116,871 B2 | 10/2006 | Sullivan et al. |
| 7,168,817 B2 | 1/2007 | Bleier et al. |
| 7,224,464 B2 | 5/2007 | Manning |
| 7,265,369 B2 | 9/2007 | Maruo |
| 7,268,960 B2 | 9/2007 | Vishnia |
| 7,275,332 B2 | 10/2007 | Blanding |
| 7,355,697 B2 | 4/2008 | Mertz et al. |
| 7,535,572 B2 | 5/2009 | Englert |
| 7,623,234 B2 | 11/2009 | Puzey |
| 7,630,081 B2 | 12/2009 | Ressler et al. |
| 7,835,077 B2 | 11/2010 | Rosenqvist |
| 7,894,055 B2 | 2/2011 | Mertz et al. |
| 7,894,057 B2 | 2/2011 | Puzey |
| 7,995,208 B2 | 8/2011 | Jacobson et al. |
| 8,092,030 B2 | 1/2012 | Bleier |
| 8,120,853 B2 | 2/2012 | Jacobson et al. |
| 8,205,852 B2 | 6/2012 | Jacobson et al. |
| 8,205,853 B2 | 6/2012 | Jacobson et al. |
| 8,454,176 B2 | 6/2013 | Bleier |
| 8,567,968 B2 | 10/2013 | Bleier |
| 8,827,468 B2 | 9/2014 | Bleier |
| 8,827,470 B2 | 9/2014 | Bleier |
| 9,377,600 B2 | 6/2016 | Vishnia et al. |
| 3,667,718 A1 | 6/2017 | Goslin et al. |
| 9,798,051 B2 * | 10/2017 | Bleier .................... G02B 7/006 |
| 2003/0007155 A1 | 1/2003 | Ota |
| 2003/0048533 A1 | 3/2003 | Lyons, III |
| 2005/0008298 A1 | 1/2005 | Sullivan et al. |
| 2005/0094155 A1 | 5/2005 | Hill et al. |
| 2007/0295155 A1 | 12/2007 | Bleier |
| 2008/0170231 A1 | 7/2008 | Ressler et al. |
| 2010/0012808 A1 | 1/2010 | Jacobson et al. |
| 2010/0033728 A1 | 2/2010 | Jacobson et al. |
| 2011/0273778 A1 | 11/2011 | Jacobson et al. |
| 2011/0308060 A1 | 12/2011 | Bleier |
| 2011/0310504 A1 | 12/2011 | Bleier |
| 2012/0091310 A1 | 4/2012 | Jacobson et al. |
| 2012/0113522 A1 | 5/2012 | Jacobson et al. |
| 2012/0218654 A1 | 8/2012 | Bleier et al. |
| 2013/0135026 A1 | 5/2013 | Bleier et al. |
| 2013/0135622 A1 | 5/2013 | Bleier et al. |
| 2013/0138226 A1 | 5/2013 | Bleier et al. |
| 2013/0167353 A1 | 7/2013 | Bleier |
| 2013/0326862 A1 | 12/2013 | Bleier |
| 2014/0029009 A1 | 1/2014 | Bleier et al. |
| 2014/0029010 A1 | 1/2014 | Bleier et al. |

OTHER PUBLICATIONS

"Notice of Allowance" for U.S. Appl. No. 12/537,028, dated Apr. 1, 2011.

"Final Office Action" issued in U.S. Appl. No. 13/036,506, dated Sep. 18, 2014.

"Office Action" issued in U.S. Appl. No. 13/036,506, dated May 28, 2014.

Authorized Officer: Lee W. Young, "International Search Report and Written Opinion" for International Application No. PCT/US12/66219, dated Mar. 27, 2013.

"Office Action" for U.S. Appl. No. 13/560,583, dated May 10, 2013.

"Interview Summary" for U.S. Appl. No. 13/560,583, dated May 29, 2013.

"Office Action" for U.S. Appl. No. 13/560,583, dated Oct. 22, 2013.

"Office Action" for U.S. Appl. No. 13/560,583, dated Mar. 19, 2014.

"Office Action" of U.S. Appl. No. 11/674,315, dated Apr. 27, 2011.

"Ex parte Quayle Communication" of U.S. Appl. No. 11/674,315, dated Jul. 21, 2011.

"Ex parte Quayle Communication" of U.S. Appl. No. 13/208,887, dated Jul. 11, 2013.

"Office Action" of U.S. Appl. No. 13/208,887, dated Nov. 7, 2012.

"Interview Summary" for U.S. Appl. No. 13/777,267, dated Apr. 28, 2014.

"Advisory Action" for U.S. Appl. No. 13/777,267, dated Apr. 2, 2014.

"Office Action" for U.S. Appl. No. 13/777,267, dated Jan. 15, 2014.

"Office Action" for U.S. Appl. No. 13/965,333, dated Dec. 31, 2013.

"Notice of Allowance" for U.S. Appl. No. 12/505,279, dated Feb. 16, 2012.

"Notice of Allowance" for U.S. Appl. No. 13/324,459, dated May 4, 2012.

"Notice of Allowance" for U.S. Appl. No. 13/180,922, dated Dec. 30, 2011.

(56) References Cited

OTHER PUBLICATIONS

"Restriction Requirement" issued in U.S. Appl. No. 13/036,506, dated Dec. 4, 2013.
Authorized Officer: Ricky D. Shafer, "International Search Report and Written Opinion" issued for International Application No. PCT/US07/08103, dated Jul. 14, 2008.
"Notice of Allowance" issued in U.S. Appl. No. 13/036,506, dated Jun. 14, 2017.
"Patent Board Decision" issued in U.S. Appl. No. 13/036,506, dated Mar. 28, 2017.
Christine Vehar, "Flexure Design for Precision and Control", http://www.engin.umich.edu/labs/csdl/ppslides/FlexureDesignForPrecisionAndControl_files/v3_document.html, dated Mar. 18, 2004.
Smith, S.T., "Flexure Design for Positioning and Control", Chap. 4, "Ultraprecision Mechanism Design", dated Jul. 8, 2009, pp. 95-112.
"Office Action" issued for U.S. Appl. No. 11/674,315, dated Sep. 19, 2008.
"Ex parte Quayle Communication" for U.S. Appl. No. 12/505,279, dated Nov. 14, 2011.
"Office Action" of U.S. Appl. No. 13/211,507, dated Nov. 27, 2012.

* cited by examiner

MOUNT FOR AN OPTICAL STRUCTURE HAVING A GROOVED PROTRUDING MEMBER AND METHOD OF MOUNTING AN OPTICAL STRUCTURE USING SUCH MOUNT

This application is a Divisional application of U.S. patent application Ser. No. 13/036,506, filed Feb. 28, 2011, the entirety of which application is incorporated herein by reference.

BACKGROUND OF THE INVENTION

This invention relates to the field of mounts for optical structures, including but not limited to, reflective panels, optical filters (absorptive and/or dichroic), hollow retroreflectors and solid retroreflectors.

Optical structures such as, but not limited to, reflective panels (mirror panels), optical filters (absorptive and/or dichroic), hollow retroreflectors and solid retroreflectors are old in the art. Solid retroreflectors are solid cubes of glass wherein adjacent sides of the cube are substantially perpendicular to each other and three of the sides that meet at a common corner are polished to have a high degree of flatness. Hollow retroreflectors are made of three mirror panels joined together preferably having optically flat reflective surfaces disposed at right angles to each other, and meeting at what can be described as a common inside corner of an imaginary cube. Both solid and hollow retroreflectors in general have the essential property of causing incident and reflected light rays to travel along substantially parallel paths.

When hollow retroreflectors are assembled for high accuracy and precision it is important to maintain the mutual perpendicularity of the reflective surfaces and sometimes essential to ensure that the retroreflector as a whole does not move. The perpendicularity of the reflective surfaces is affected by external stresses. With regard to high accuracy and precise reflective panels, such as mirror panels to be used for high accuracy purposes, it is also important to try and maintain as optically flat as possible the reflective surface of the panel.

Examples of external stresses that can affect the optical flatness of a reflective panel, an optical filter and/or the perpendicularity of reflective surfaces of abutting reflective panels of a hollow retroreflector, are thermal expansion or contraction of the substrate material from which the panels are made, deflection caused by curing of the adhesives used to join elements together and/or to join the retroreflector to its mount and/or the mass of the panels themselves. Accordingly, it would be desirable to assemble together the elements of a hollow retroreflector or of an optical filter, and/or to assemble a reflective panel to a mount, in such a manner as to reduce these stresses. It would also be desirable that the manner of mounting an optical filter, reflective panel(s) and/or a retroreflector to its mount not add to these stresses, but nevertheless, securely retain the optical filter, reflective panel(s) and/or retroreflector on the mount. Examples of hollow retroreflector mounts which have proven successful in maintaining the reflective surfaces in their perpendicular orientations are found in U.S. Pat. No. 3,977,765, to Morton S. Lipkins, U.S. Pat. No. 5,122,901, to Zvi Bleier, and U.S. Pat. No. 5,335,111, also to Bleier.

Additionally, any prior art mounts that may include flexible materials cannot, and do not, maintain the dimensional stability ("DS") such that various forces working on a connected optical structure may be constantly changing the dimensions of that optical structure.

The present mount also achieves secure mounting of the optical structure in a manner designed to help eliminate deflective stresses on the reflective surface(s) of the structure caused by the mounting of the optical structure, such as the optical filter, the reflective panel(s) and/or the retroreflector to its mount. One or more aspects of the present mount also achieve dimensional stability ("DS") such that a "hard mount" is achieved. One or more further aspects of the present invention permit the hard mounts to maintain any provided degree of flatness (e.g., at least about $\lambda/4$, at least about $\lambda/10$, between about $\lambda/4$ and about $\lambda/30$, etc.) and more particularly, to maintain a high degree of flatness (e.g., at least about $\lambda/20$, at least about $\lambda/15$, between about $\lambda/15$ and about $\lambda/20$, between about $\lambda/15$ and about $\lambda/30$, etc.) after the mount is constructed.

The mount also allows for easy and secure mounting of the optical structure onto a support structure.

SUMMARY OF THE INVENTION

In accordance with the invention, an improved mount for, and method of mounting an optical structure is provided. The mount has a protruding member extending from a surface of the optical structure, a base element having a mounting structure for mounting the mount to another structure and an upper element extending from the base element having a first opening extending therethrough for receipt therein of at least a portion of the protruding member. The first opening defines first and second arms, each of the arms comprising a head portion and each of the head portions ending at an end. A second opening in the upper element extends through one of the head portions and the end thereof in a direction toward the other head portion, while a third opening exists in the upper element through the end of the other head portion in an orientation substantially opposite to and in communication with the second opening so that a tightening mechanism received through the second opening can be received into the third opening. Tightening of the tightening mechanism into the third opening causes the ends of the head portions to draw toward each other so that the first opening of the upper element tightens around the at least a portion of the protruding member.

In accordance with at least another aspect of the invention, the protruding member may have a first portion extending from a surface of the optical structure, a second portion, and a groove defining the first and second portions on each side of the groove, thereby permitting the groove and/or the protruding member to dissipate and/or eliminate one or more stresses passing through the mount and affecting the optical structure. Tightening of the tightening mechanism into the third opening may cause the ends of the head portions to draw toward each other so that the first opening of the upper element tightens around the at least second portion of the protruding member. The groove may be disposed on the protruding member such that the first portion is smaller than the second portion. The groove may be constructed on the protruding member such that the groove is spaced away from the optical structure and is located on the protruding member at a predetermined distance from the optical structure and/or from the top surface of the protruding member. The first portion of the protruding member may be smaller, substantially equal to, or larger than the second portion of the protruding member.

The method of mounting the optical structure onto the mount is to form an optical structure having a reflective surface and a portion of the mount comprising a protruding member extending from a back surface of the optical structure, wherein the protruding member is either integrally formed with, or bonded to, the back surface of the optical structure. Forming the remainder of the mount comprising a base element having a construction for allowing the mount to be mounted to another structure, the mount further having an upper element having a first opening extending therethrough, such first opening forming two arms each having a head portion and ending at ends thereof. Sliding the first opening of the mount over at least a portion of the protruding member. Tightening the first opening of the mount around the protruding member by inserting a tightening mechanism into a second opening located through one of the head portions of the mount and by further inserting and tightening the tightening member into a third opening in the other head portion of the mount so that the tightening member draws the two ends of the head portions toward each other thereby contracting the first opening of the mount around the protruding member of the optical structure.

In accordance with at least an additional aspect of the invention, the method of mounting the optical structure onto the mount is to form an optical structure having a reflective surface and a portion of the mount comprising a protruding member extending from a back surface of the optical structure, wherein the protruding member is either integrally formed with, or bonded to, the back surface of the optical structure. The protruding member may have a first portion extending from the back surface of the optical structure, a second portion, and a groove defining the first and second portions on each side of the groove, thereby permitting the groove and/or the protruding member to dissipate and/or eliminate one or more stresses passing through the mount and affecting the optical structure. Tightening the first opening of the mount around the at least second portion of the protruding member by inserting a tightening mechanism into a second opening located through one of the head portions of the mount and by further inserting and tightening the tightening member into a third opening in the other head portion of the mount so that the tightening member draws the two ends of the head portions toward each other thereby contracting the first opening of the mount around the at least second portion of the protruding member of the optical structure. The groove may be constructed in between the first and the second portions of the protruding member such that the first portion is smaller than, substantially equal to and/or larger than the second portion. The groove may be constructed on the protruding member such that the groove is spaced away from the optical structure and is located on the protruding member at a predetermined distance from the optical structure and/or from the top surface of the protruding member.

In accordance with yet another aspect of the invention, at least one embodiment of the mount, and similarly at least one embodiment of the method of mounting, may further involve one or more reliefs (also referred to as notches or depressions) that may be formed either in/on (e.g., in communication with, as part of, etc.) the perimeter of the recess of the mount or may be formed on/in/around the perimeter (e.g., in communication with, as part of, etc.) in the bottom portion of the protruding member, thereby reducing physical contact, and, thus, the transfer of pressure or stresses/forces between the mount and the protruding member. The one or more reliefs may be in communication with at least one of: (i) the first opening, the one or more reliefs being positioned in/on a perimeter of the first opening and the one or more reliefs operating to reduce physical contact between one or more surfaces of the protruding member and one or more surfaces of the upper element of the mount, thereby reducing and/or eliminating transfer of one or more stresses between the upper element of the mount and the protruding member; and (ii) at least the second portion of the protruding member, the one or more reliefs being positioned in/on a perimeter of at least the second portion of the protruding member and the one or more reliefs operating to reduce physical contact between one or more surfaces of the protruding member and one or more surfaces of the upper element of the mount, thereby reducing and/or eliminating transfer of one or more stresses between the upper element of the mount and the protruding member. Preferably, the one or more reliefs are radial reliefs (e.g., extending from an outside surface inwardly towards the center of the protruding member, extending from an interior surface of the recess in the mount outwardly towards an outside surface of the mount, etc.). The one or more reliefs may extend a predetermined distance radially from the first opening towards an exterior of the upper element when the one or more reliefs are positioned in/on the perimeter of the first opening. Additionally or alternatively, the one or more reliefs may extend a predetermined distance radially from the at least second portion of the protruding member towards an interior of the protruding member when the one or more reliefs are positioned in/on the perimeter of at least the second portion of the protruding member.

The present invention and one or more components thereof are operable and adaptable to be used in conjunction with any suitable optical mount including, but not limited to, U.S. patent application Ser. No. 11/674,315, filed on Feb. 13, 2007, having the same assignee as the present application, which is incorporated by reference herein in its entirety.

Accordingly, it is an object of the invention to provide an improved mount for an optical structure.

Another object of the invention is to provide an improved mount for an optical structure which causes minimal external stresses to the reflective surfaces of the optical structure.

Still another object of the invention is to provide an improved mount for an optical structure wherein the mount achieves reductions in movement of the optical structure in order to achieve higher-accuracy distance measurements.

Yet a further object of the invention is to provide an improved mount for an optical structure wherein the mounting of the mount and optical structure to a support structure is easy and secure.

It is even a further object of the invention to provide an improved method of mounting an optical structure using the improved mount.

Other objects of the invention will in part be obvious and will in part be apparent from the following description.

BRIEF DESCRIPTION OF THE DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown, but rather only by the claims. To assist those of ordinary skill in the relevant art in making and using the subject matter hereof, reference is made to the appended drawings and figures, wherein:

DETAILED DESCRIPTION OF THE PREFERRED EMBODIMENTS

An improved mount for, and method of mounting, an optical structure having a grooved/relieved protruding member are disclosed herein. The mount may have the grooved/relieved protruding member extending from a surface of the optical structure, a base element for mounting the mount to another structure and an upper element extending from the base element having a first opening extending therethrough for receipt therein of at least a portion of the grooved/relieved member. The first opening defines first and second arms, each of the arms comprising a head portion and each of the head portions ending at an end. A second opening in the upper element extends through one of the head portions and the end thereof in a direction toward the other head portion, while a third opening exists in the upper element through the end of the other head portion in an orientation substantially opposite to and in communication with the second opening so that a tightening mechanism may be received through the second opening and the third opening. Tightening of the tightening mechanism into the third opening causes the ends of the head portions to draw toward each other so that the first opening of the upper element tightens around the at least a portion of the grooved/relieved protruding member. With the grooved/relieved protruding member, the mount provides the aforementioned advantages of providing a "hard mount" with dimensional stability and a high degree of optical flatness while also substantially reducing and/or eliminating stresses/forces from affecting the connected optical structure.

Figure 1:
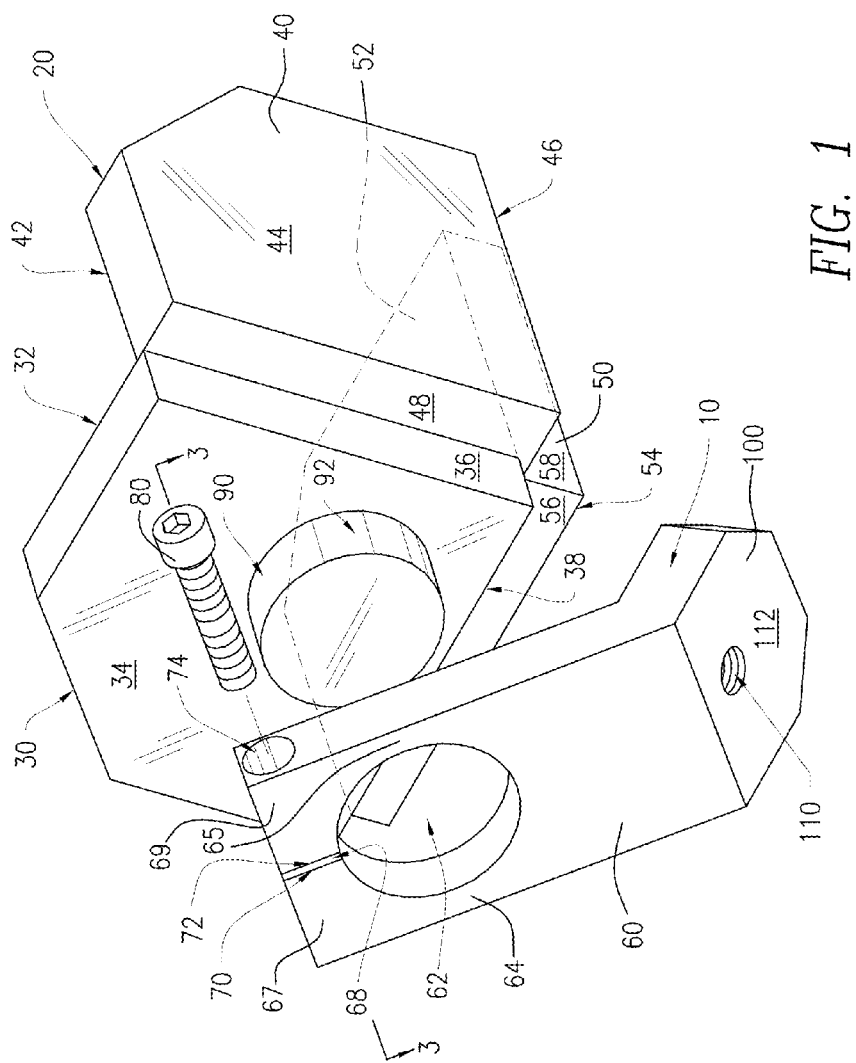
FIG. 1 is an exploded perspective view of a mount, optical structure and screw, made in accordance with at least one embodiment of the present invention.
Figure 5:
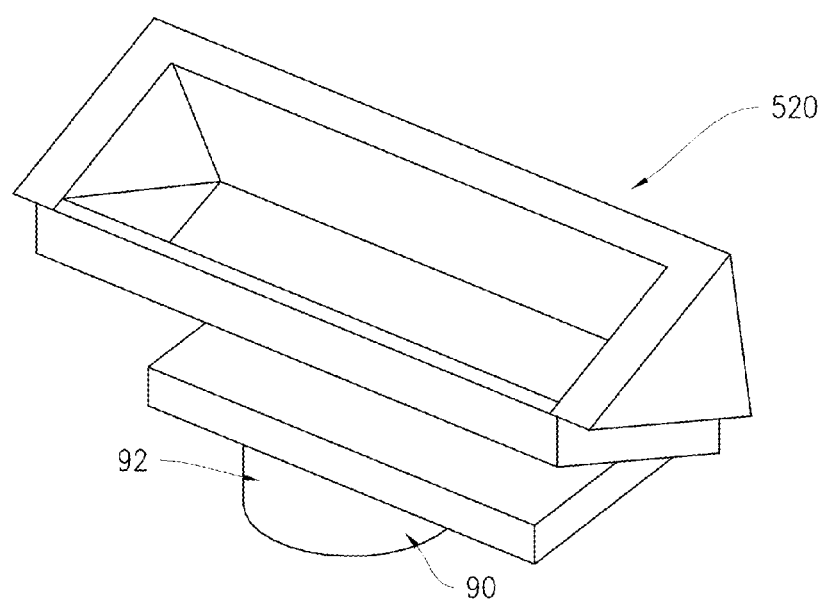
FIG. 5 is a perspective view of a roof mirror having a pin extending therefrom in accordance with one or more embodiments of the present invention.

Turning now to the details of the figures, FIG. 1 is an exploded perspective view of a mount in accordance with at least one aspect of the present invention. A mount for an optical structure made in accordance with the invention is generally designated at 10 (best seen in FIGS. 1-2). In the particular case of the figures of this application, the optical structure portrayed is that of a hollow retroreflector, which will hereinafter generally be designated in the figures at 20. It is of course to be understood that other optical structures are anticipated to be compatibly used with mount 10, including but not limited to, roof mirrors (see e.g., roof mirror 520 of FIG. 5), optical filters and/or individual refractive/reflective/mirror panels (see e.g., optical filter 820 of FIGS. 8-9), and/or solid retroreflectors (not shown).

Retroreflector 20 is preferably made of fused quartz or fine annealed Pyrex (i.e., any type of borosilicate glass or glasses having a low coefficient of thermal expansion), while mount 10 is preferably made of a metal alloy having a very low coefficient of thermal expansion, such as INVAR (e.g., a nickel iron alloy having a low coefficient of thermal expansion) or aluminum.

Hollow retroreflector 20 is comprised of a first panel 30, a second panel 40, and a third panel 50. Each of the panels 30, 40 and 50 has a corresponding reflective surface 32, 42 and 52. The higher the degree of optical flatness achieved in surfaces 32, 42 and 52 will in part determine the accuracy of the corresponding panels 30, 40 and 50. Panels 30, 40 and 50 are disposed substantially at right angles to each other so that reflective surfaces 32, 42 and 52 are also disposed substantially at right angles to each other. Each of panels 30, 40 and 50 also has non-reflective, back surfaces 34, 44 and 54 which are opposite to reflective surfaces 32, 42 and 52.

As with all hollow retroreflectors, retroreflector 20 is designed to receive an incoming (incident) light ray (not shown) and reflect the light ray off of the reflective surfaces 32, 42 and 52 and out from retroreflector 20 along a path substantially parallel to the incident light ray. Of course, the incident light ray can initially strike any one of the reflective surfaces without bearing upon the accuracy of the parallelism of the reflected light ray. The accuracy tolerances for retroreflector 20 will almost always depend upon the function to be performed by retroreflector 20. If high degrees of accuracy, i.e., parallelism of the incident and reflected light rays, is a primary purpose of retroreflector 20, then high degrees of precision must be created and maintained with respect to the flatness of and perpendicularity of reflective surfaces 32, 42 and 52.

One construction for a hollow retroreflector is as disclosed in U.S. Pat. No. 3,663,084 to Morton S. Lipkins. If the construction shown in the '084 patent is used herein, then each of panels 30, 40 and 50 of hollow retroreflector 20 has at least first and second sides 36 and 38, 46 and 48 and 56 and 58, respectively. The first and second sides of each of the panels are substantially perpendicular to each other and to each of the other sides of the other panels. As is seen in the figures, particularly FIGS. 1-2, second side 48 of panel 40 is abutted against and adhered to reflective surface 32 of panel 30, second side 38 of panel 30 is abutted against and adhered to reflective surface 52 of panel 50, and second side 58 of panel 50 is abutted against and adhered to reflective surface 42 of panel 40. Accordingly, each of panels 30, 40 and 50 is simultaneously an abutting panel at second sides 38, 48 and 58, and an adjacent panel at first sides 36, 46 and 56.

Turning now to a discussion of mount 10, it is seen from the figures (best seen in FIGS. 1-2, 4A, and 6-7) that mount 10 has an upper element 60 and a base element 100.

As seen in the figures (best seen in FIGS. 1-2, 4A, and 6-7), base element 100 has extending therein an opening 110. Opening 110 preferably extends through a bottom surface 112 of base 100, but may be placed anywhere on base 100. Opening 110 is preferably threaded to receive a correspondingly threaded member (see e.g., threaded extending member 123 of FIG. 4A) extending from some type of support structure (see e.g., support structure 140 of FIG. 4A). However, it is also to be understood that instead of having opening 110, a base element 100a having a bottom surface 112a may have an outwardly extending member (see e.g., threaded extending member 123a of FIG. 4B) which would in turn be received into a cooperating opening 110a on a support structure (see e.g., support structure 140a of FIG. 4B). In this instance also it is preferred that the extending member and support opening both be threaded to allow for a more secure connection between the two. Additionally, other mounting constructions are intended to be encompassed in the invention, such as the use of a clamp from the support structure to securely hold base element 100, 100a, 100b, other structural arrangements for the base element 100, 100a, 100b and the upper element 60, 60a, 60b (see e.g., FIGS. 8-9 further discussed below), as are other constructions.

Figure 2:
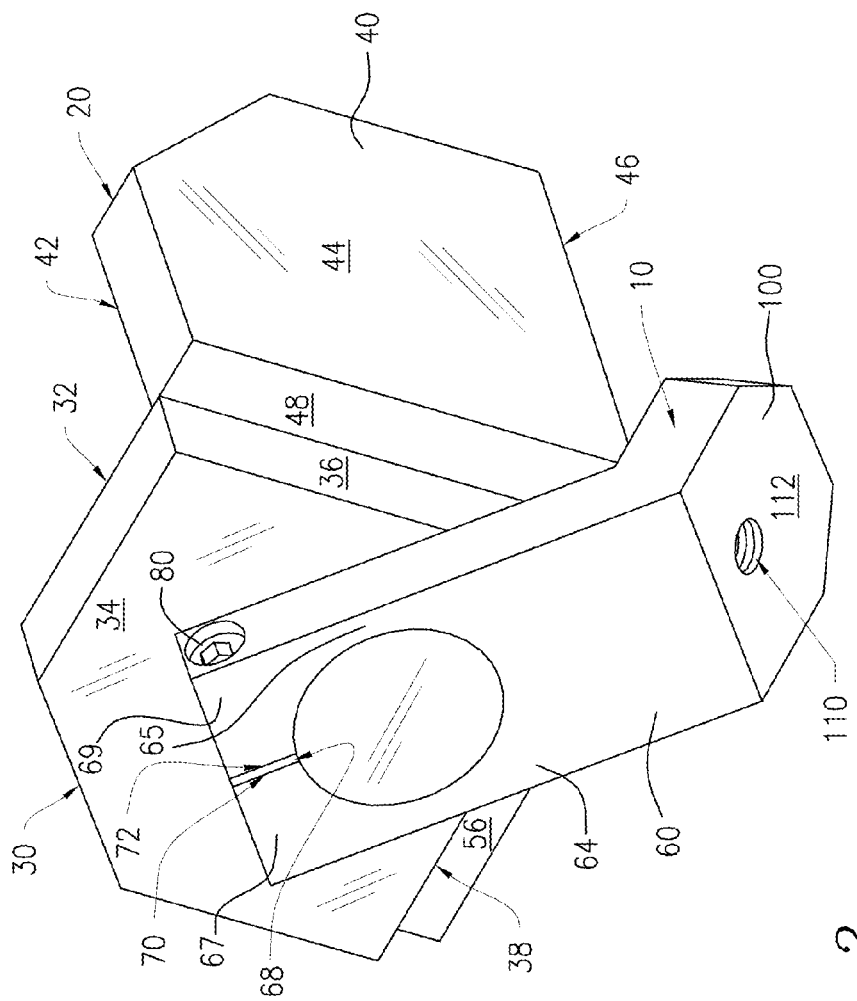
FIG. 2 is a perspective view of the structures of FIG. 1 as joined together.
Figure 3:
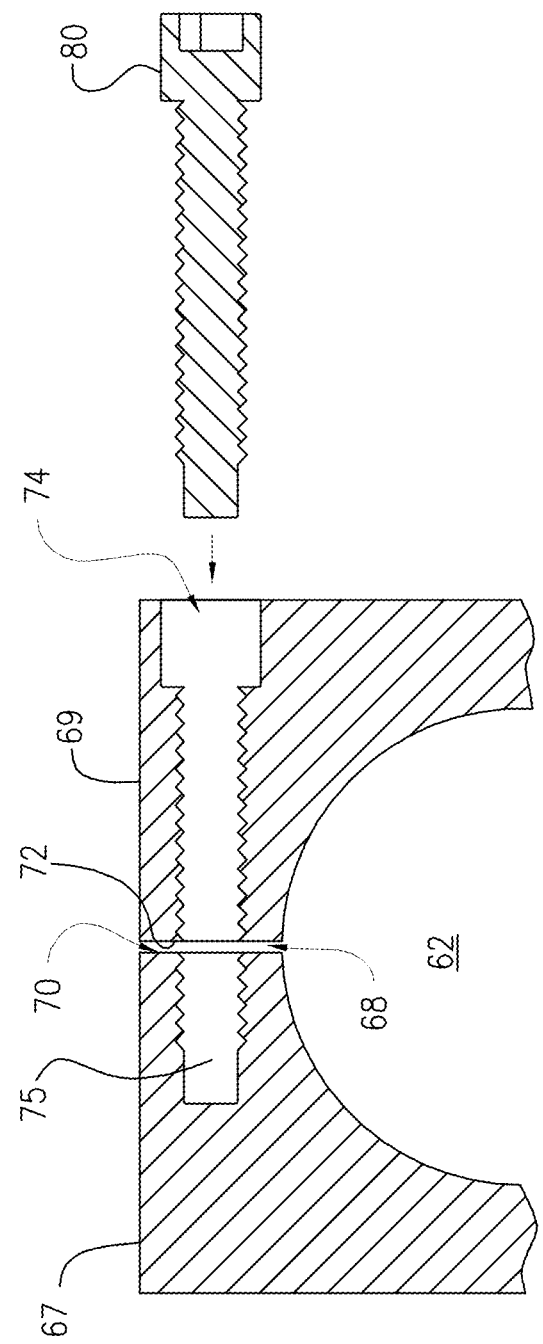
FIG. 3 is a cross-sectional view taken along line 3-3 of FIG. 1.

Turning now to a discussion of upper element 60 of mount 10, it is seen in FIGS. 1-3 that in a preferred embodiment upper element 60 has an opening 62 extending therethrough. In the embodiment shown herein opening 62 is circular and such a circular opening is preferred, but not mandatory, it being anticipated by the invention herein that opening 62 may be any geometric shape. It is also seen that opening 62 of upper element 60 creates two arms 64 and 65, each having a respective head portion 67 and 69. Head portion 67 ends at end 70, while head portion 69 ends at end 72. Ends 70 and 72 do not touch and have a gap 68 extending therebetween. Through head 69 extends opening 74, through which screw/bolt/tightening mechanism 80 (also referred to as "element 80") is received. Opening 74 extends completely through head 69 and end 72 of head 69. As is best shown in FIG. 3, a corresponding and communicating opening 75 extends through end 70 of head 67, so that element 80 is able to be received therein. Assuming element 80 is threaded and that at least opening 75 is also threaded, then as element 80 is tightened into opening 75, ends 70 and 72 are drawn together. As ends 70 and 72 draw together, opening 62 of element 60 becomes smaller; i.e., the diameter lessens, thereby creating a clamping force against protruding member 90 of panel 30, discussed in more detail below. It is also to be understood herein that some, or all of, opening 74 may be correspondingly threaded to receive element 80. Such a mount, and method for constructing same, is the subject of U.S. patent application Ser. No. 11/674,315, filed on Feb. 13, 2007, having the same assignee as the present application, which is incorporated by reference herein in its entirety.

To help secure element 80 within the opening in end 70, all of, or at least a portion of, opening 74 may also be correspondingly threaded. In the figures as shown, element 80 is a threaded bolt having an Alan wrench opening in its head for tightening and loosening element 80, as is known in the art. Other elements 80 are anticipated herein; such as, but not limited to, screws and/or bolts having Philips or flat head openings. Other manners of tightening the clamping force of opening 62 by bringing ends 70 and 72 together are also anticipated herein, the primary inventive concept being the mounting of mount 10 through opening 62 onto protruding member 90. As way of a further example, another embodiment of the invention may involve no element 80 and no gap 68 between ends 70 and 72. Instead, opening 62 may be continuous and sized so that a little adhesive applied between the outer surface 92 of protruding member 90 allows opening 62 to be adhered to surface 92. Tightening mechanism or element 80 may be made from any material known to one skilled in the art, including, but not limited to, glass, metals, metal alloys, polymers, one or more materials having a low coefficient of thermal expansion, etc.

Turning now to a more detailed discussion of member 90 (also referred to as "protruding member 90" or "pin 90"), panel 30 may be formed such that member 90 is an integrally extending part of panel 30 or member 90 may be a separate member that is bonded to back surface 34 of panel 30. In the preferred embodiment, bonding refers to fusing or adhering member 90 to back surface 34 of panel 30. As seen in the figures (best seen in FIGS. 1-2), member 90 is circular in cross section to conform to opening 62 of mount 10. However, as has been previously discussed, if opening 62 takes a different shape, member 90 would take the same shape as that of opening 62.

The method of mounting optical structure 20 onto mount 10 is to form an optical structure having a reflective surface and a protruding member extending from a back surface of the optical structure, wherein the protruding member is either integrally formed from, or bonded to, the back surface of the optical structure. Forming a mounting member having a base element having a construction for allowing the mounting member to be mounted to another structure, the mounting member further having an upper element having a first opening extending therethrough, such first opening forming two arms each having a head portion and ending at ends thereof such that the ends are preferably separated by a gap therebetween at least when the mounting member is not attached to the optical structure. Sliding the first opening of the mounting member over the protruding member of the optical structure. Tightening the first opening of the mounting member around the protruding member by inserting a tightening mechanism into a second opening located through one of the head portions of the mounting member and by further inserting and tightening the tightening member into a third opening in the other head portion of the mounting member so that the tightening member draws the two ends of the head portions together thereby contracting the first opening of the mounting member around the protruding member of the optical structure. The tightening member preferably being a threaded bolt which is received into the third opening and the third opening also being threaded. As previously stated above, the second opening of the mounting member may also be threaded in whole or in part along its length.

The manner of mounting described herein is an improvement over prior mounting manners and is equally good, if not better, at preventing distortion of reflective surface 32 (and therefore of reflective surfaces 42 and 52) so as to help maintain reflective surfaces 32, 42 and 52 in their substantially flat and substantially perpendicular relationship to each other. In particular, with the manner of mounting described herein there are no distortional stresses applied on reflective surface 32 by either the securing forces exerted by the contracting of first opening 62 around protruding member 90 or due to contraction or expansion of the mounting member due to temperature change, or other reasons. In particular, due to the orientation of protruding member 90 to reflective surface 32 and further since any such contracting or distortional forces exerted on member 90 from the mounting member are applied in directions/planes that are parallel to reflective surface 32, and not perpendicular to it, such forces will only nominally, if at all, affect the optical flatness of surface 32.

It will also be seen that the manner of mounting described herein achieves substantial rigidity between optical structure 20 and mount 10. Further, as described in the immediate above paragraph, the preferred low coefficient of thermal expansion metal alloy material which makes up mount 10 significantly reduces the effects of thermal expansion/contraction of mount 10 so as to substantially minimize these effects on the accuracy of optical structure 20.

Figure 6:
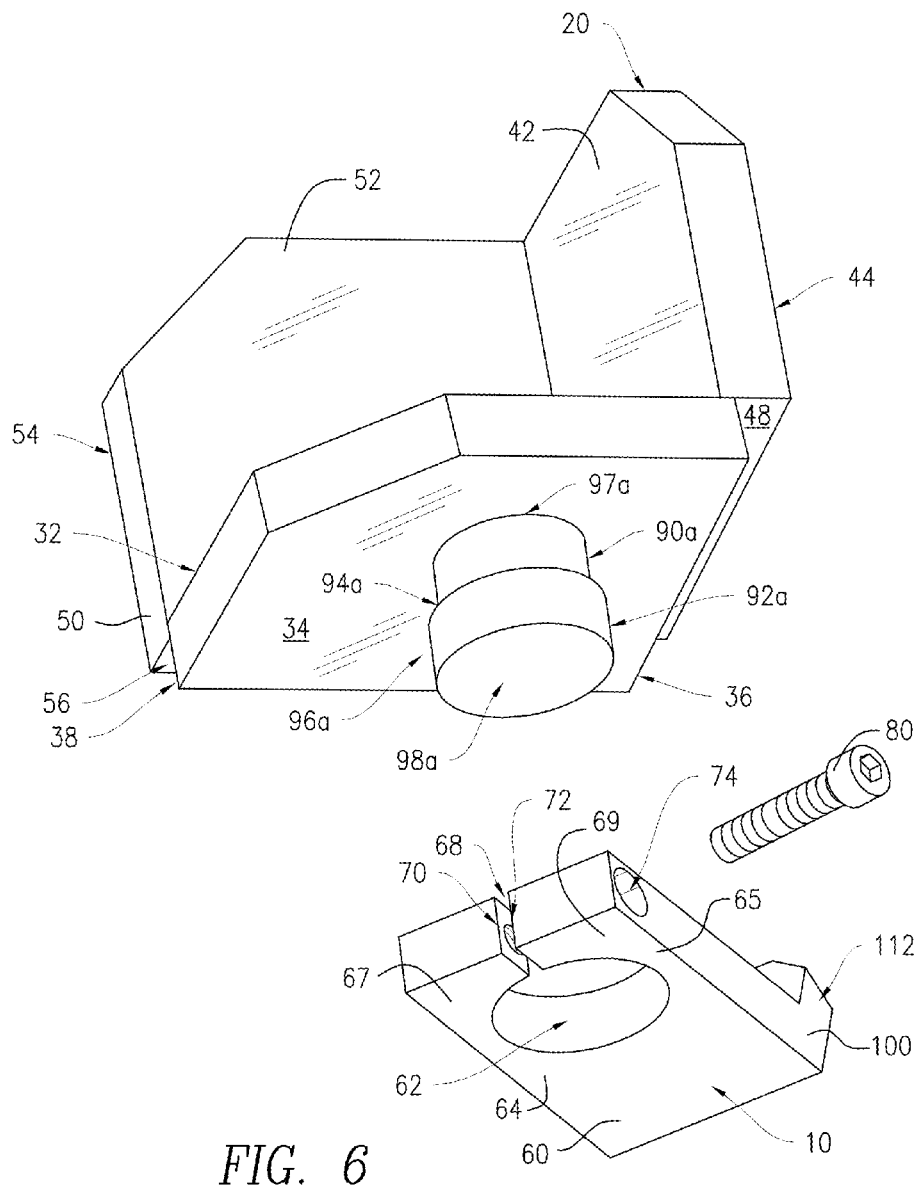
FIG. 6 is an exploded perspective view of an alternative embodiment of a mount, optical structure and screw, made in accordance with one or more embodiments of the present invention.
Figure 7:
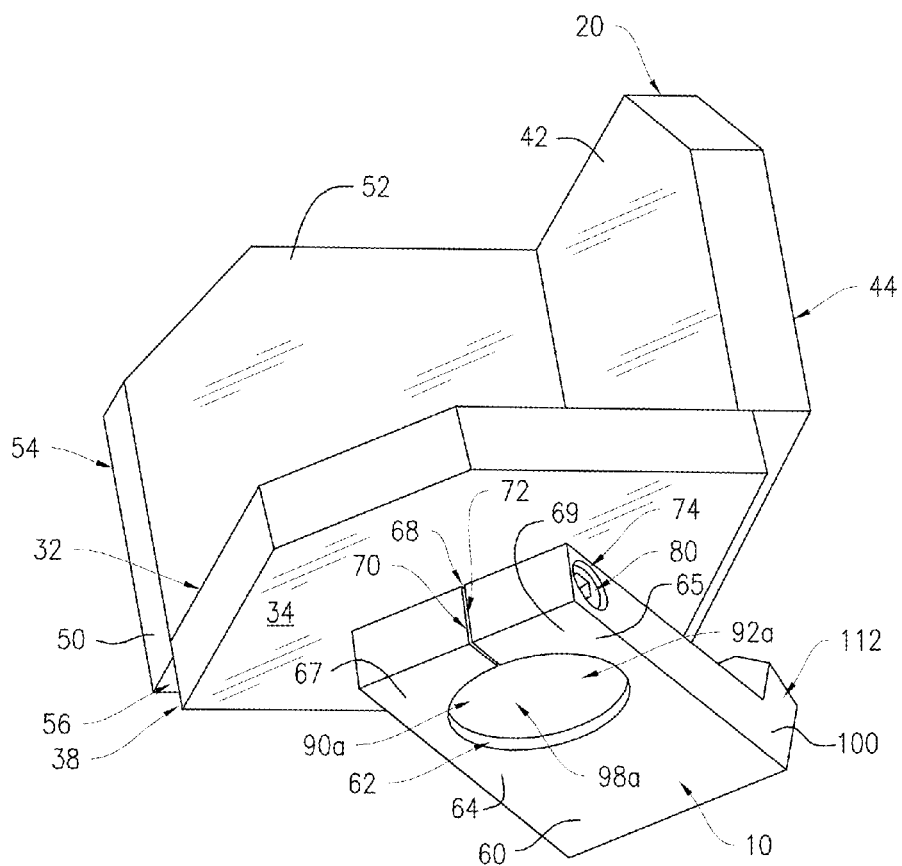
FIG. 7 is a perspective view of the structures of FIG. 6 as joined together.

In accordance with at least another aspect of the present invention, a critical, structural improvement to the aforementioned protruding member 90 structure has been unexpectedly achieved by the modification of the member 90 to include a relief or groove to further dissipate pressure on any connected optical structure and to more optimally maintain dimensional stability of the optical structure, protruding member and mount assembly. As illustrated in FIGS. 6-7, the modified pin or protruding member 90a having an outer surface 92a includes a relief or groove 94a such that a top surface 97a (also referred to as a first portion 97a while the phrase "a first portion 97a" may refer to another portion, or a portion including the top surface 97a of member 90a, e.g., the portion of member 90a that is located above the second portion 96a discussed below) of the member 90a that operates to be connected (e.g., via fusing, adhering, bonding, etc.) to an optical structure, such as retroreflector 20, may be smaller than a lateral cross-section, such as bottom surface 98a, of a base portion 96a (also referred to as a second portion 96a) of the member 90a that operates to be located, and locked/tightened, within opening 62 of the mount 10. The first portion 97a may, alternatively, be substantially the same size as or larger than the second portion 96a. Preferably, the groove 94a extends laterally along the protruding member 90a and defines the first portion 97a and the second portion 96a on each side of the groove 94a. While bonding may be used, permanently fusing the pin 90, 90a having the groove 94a to the bottom of the optical structure 20 provides the advantage of eliminating the need for use of a bonding technique and, thus, enables a much more stable and durable mounting method for achieving a "hard mount" with dimensional stability and/or maintaining a provided degree of optical flatness or a high degree of optical flatness.

There are various ways for the top surface 97a to be "smaller" than the lateral cross-section, such as the bottom surface 98a, (e.g., may be done in such a way that the structural integrity of the protruding member 90, 90a is preserved) including, but not limited to, the top surface 97a having a smaller surface area than the lateral cross-section, such as the bottom surface 98a, the top surface 97a having a smaller diameter than the lateral cross-section, such as the bottom surface 98a, etc. Preferably, the diameter and/or the surface area of the top surface 97a is substantially smaller than the diameter and/or the surface area of the lateral cross-section, such as the bottom surface 98a, such that the diameter of the top surface 97a is equal to or lesser than about the diameter of the lateral cross-section, such as the bottom surface 98a, minus ten percent (10%). The groove 94a may be various sizes. Preferably, the groove 94a does not extend more than about 10% of the optical component size, or does not extend more than about 15% of the optical component size. For example, the groove 94a may be about 50,000ths of an inch from a perimeter of the base portion of the protruding member 90, 90a (e.g., the depth of the groove may be: (i) about 5% to about 15% from the outer diameter of the protruding member 90, 90a (ii) about 10% to about 15% from the outer diameter of the protruding member 90, 90a; etc.). For example, a 2 inch diameter post 90, 90a may have a groove 94a that is about 200,000ths to about 250,000ths of an inch from the outer diameter of the protruding member 90, 90a. Additionally or alternatively, the groove 94 may be spaced at least one of: about 50,000ths of an inch from the optical structure 20; about 200,000ths to about 250,000ths of an inch from the optical structure 20; about 200,000ths of an inch from the optical structure; about 250,000ths of an inch from the optical structure 20; and about 50,000ths of an inch to about 250,000ths of an inch from the optical structure 20. Preferably, an optical beam that enters the optical structure, such as retroreflector 20, is not larger than 3" clear aperture. However, the optical beam may be larger than 3" clear aperture in at least another embodiment. The groove 94a and/or the member 90, 90a may be created by any method known to one skilled in the art, including, but not limited to, grinding, etching, laser etching, cutting, etc.

Preferably, in at least one embodiment of the present invention, the groove 94a of the protruding member 90a elevates and/or spaces any optical structure, such as the retroreflector 20, connected thereto away from the base portion 96a of the member 90a and/or the mount 10 because the groove 94a may comprise space in between the optical structure and at least one of: (i) the base portion 96a of the member 90a and (ii) the mount 10. The groove 94a may space the optical structure 20 away from the base portion 96a and/or the mount 10 such that the optical structure, e.g., the retroreflector 20, does not directly contact a portion or surface of at least one of: the mount 10, the base portion 96a of the member 90a, the upper element 60 of the mount 10 and the base element 100 of the mount 10. Such structure is constructed to, and operates to: (i) concentrate any stress or force from the mount 10 onto the member 90a rather than directly onto the optical structure 20; and (ii) reduce/dissipate and/or eliminate any resulting stress or force from distorting, or otherwise affecting, the optical structure 20. When the mount is assembled such that the top surface 97a of member 90a is connected/fused to the optical structure 20 and the base portion 96a of the member 90a is tightened/clamped within the upper element 60 of the mount 10, various types of stresses affect the assembly, including, but not limited to, tightening/clamping stress in between arms 64 and 65 of the mount 10, stress from rotation/tightening of the element 80 within mount 10, etc. However, because the member 90a includes groove 94a, such stresses that would otherwise be affecting the optical structure 20 more greatly are instead surprisingly and significantly dissipated/reduced and/or eliminated.

Figure 12A:
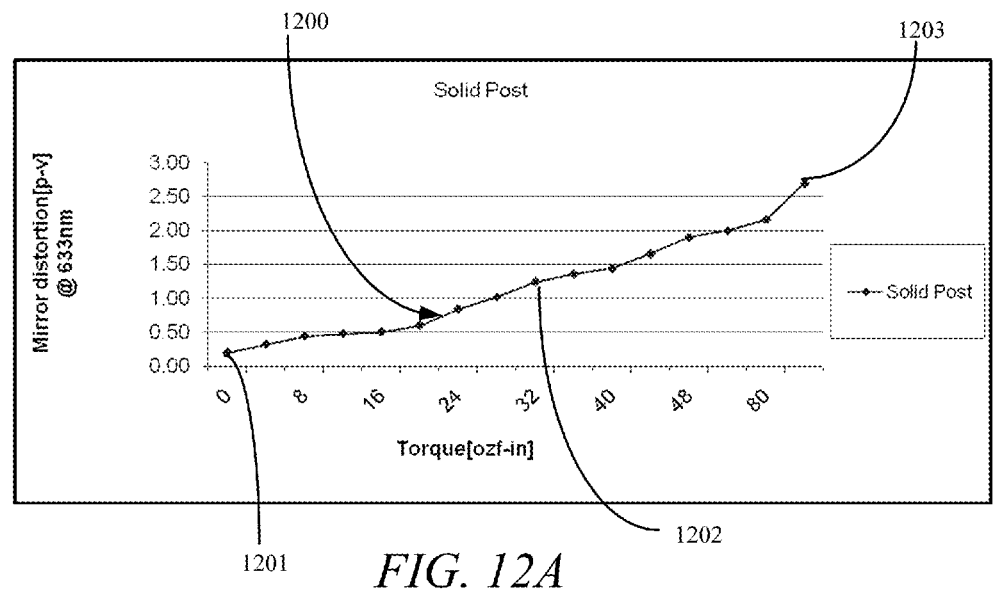
FIGS. 12A-12B are graphs illustrating the unexpected and critical reduction and/or elimination of various forces/stresses on the optical structure by the experiment performed to compare the torque, and mirror (or optical) distortion resulting therefrom, affecting an optical structure having a protruding member without a groove (also referred to as a "Solid Post"; data shown in FIG. 12A) with the torque, and mirror (or optical) distortion resulting therefrom, affecting an optical structure having a protruding member with a groove (also referred to as a "Relieved Post"; data shown in FIG. 12B)

The aforementioned unexpected and critical reduction and/or elimination of various forces/stresses on the optical structure is evidenced by the experiment performed to compare the torque, and mirror (or optical) distortion resulting therefrom, affecting an optical structure having a protruding member without a groove (also referred to as a "Solid Post") (e.g., as shown in FIG. 1) with the torque, and mirror (or optical) distortion resulting therefrom, affecting an optical structure having a protruding member with a groove (also referred to as a "Relieved Post") (e.g., as shown in FIG. 6). The results of the experiment are illustrated in FIGS. 12A (i.e., "Solid Post" data) and 12B (i.e., "Relieved Post" data). As shown in FIG. 12A for the "Solid Post", the mirror distortion ("P-V" or "peak-to-valley") at a wavelength of 633 nanometers ("nm") ranged from about 0.2 P-V at a torque near zero ounce-force-inch (or "ozf-in") (see data point 1201 on curve 1200 in FIG. 12A) to about 2.75 P-V at a torque greater than 80 ounce-force-inch (see data point 1203 on curve 1200 in FIG. 12A). At a torque value of about 32 to about 34 ounce-force-inch (e.g., about middle of the range measured; see data point 1202 on curve 1200 in FIG. 12A), the mirror distortion was measured at about 1.25 P-V.

Figure 12B:
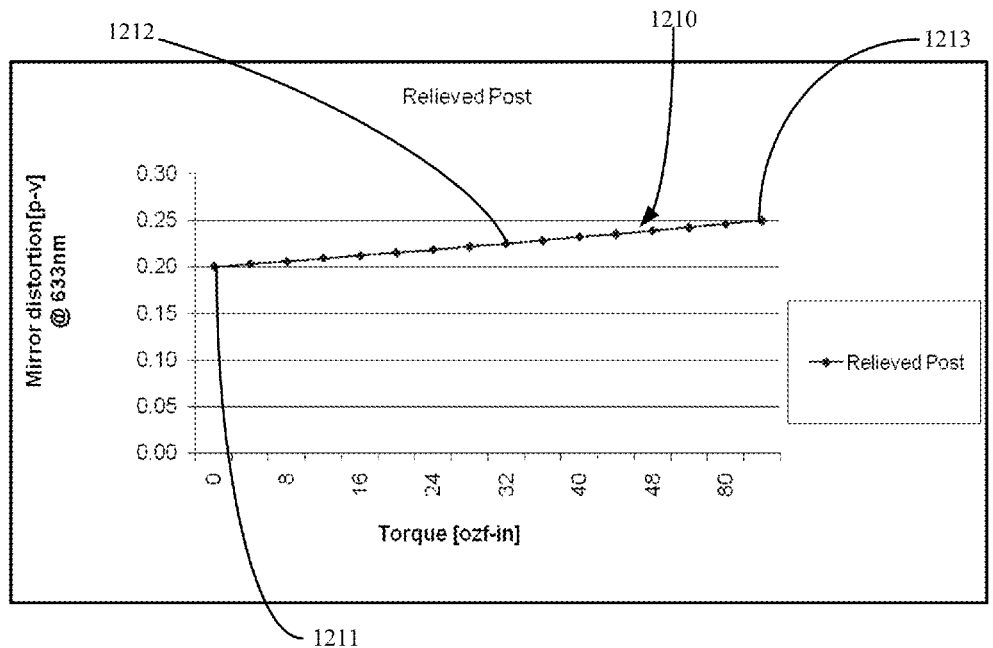

In contrast, as shown in FIG. 12B for the "Relieved Post", the mirror distortion ("P-V" or "peak-to-valley") at a wavelength of 633 nanometers ("nm") ranged from about 0.2 P-V at a torque near zero ounce-force-inch (or "ozf-in") (see data point 1211 on curve 1210 in FIG. 12B) to about 0.25 P-V at a torque greater than 80 ounce-force-inch (see data point 1213 on curve 1210 in FIG. 12B). At a torque value of about 32 to about 34 ounce-force-inch (e.g., middle of the range measured; see data point 1212 on curve 1210 in FIG. 12B), the mirror distortion was measured at about 0.225 P-V.

The mount used for the "Solid Post" experiment (e.g., data shown in FIG. 12A) is substantially similar or identical to, and is, therefore, representative of the mount depicted in FIG. 1 or variations thereof in accordance with one or more aspects of the present invention. Similarly, the mount used for the "Relieved Post" experiment (e.g., data shown in FIG. 12B) is substantially similar or identical to, and is, therefore, representative of the mount depicted in FIG. 6 or variations thereof in accordance with one or more aspects of the present invention. Indeed, the results of the "Solid Post" and "Relieved Post" experiment (e.g., as shown in FIGS. 12A and 12B, respectively) are representative of various embodiments in accordance with one or more aspects of the present invention. While the experiment was performed at a wavelength of 633 nm, it is important to note that if the experiment was repeated at a different wavelength, the experimental data from that additional experiment would indicate the same relationship or correlation between torque and mirror distortion. Thus, these results: (i) illustrate practical conditions; (ii) are representative of general conditions for such optical structure mount assemblies; and (iii) also indicate that the addition of the groove is unique and achieves critical results/advantages, thereby supporting the groove modification as being novel and nonobvious.

The experimental data clearly indicates the critical improvement of employing a protruding member (or post) having a groove (or relief) instead of a protruding member (or post) without a groove (or relief). For example, when comparing the mirror distortions that occurred at the two torque values of about 32-34 ozf-in (i.e., about 1.25 P-V for Solid Post and about 0.225 P-V for Relieved Post; see data point 1202 in FIG. 12A and data point 1212 in FIG. 12B, respectively) and greater than 80 ozf-in (i.e., about 2.75 P-V for Solid Post and about 0.25 P-V; see data point 1203 in FIG. 12A and data point 1213 in FIG. 12B, respectively), the Solid Post assembly exhibited mirror distortions that were 555.55% greater and 1100% greater, respectively, than the mirror distortions of the Relieved Post assembly. Such results were quite surprising and greater than any expected reduction in mirror distortions due to the addition of the groove or relief, such as groove 94a. Specifically, it is quite surprising that the distortion for the Relieved Post is consistently and minimally/barely increasing from about 0.2 P-V (e.g., at data point 1211 in FIG. 12B) to about 0.25 P-V (e.g., at data point 1213 in FIG. 12B) across the entire range of torque applied whereas the distortion for the Solid Post discussed above is much more erratic and increases greatly from about 0.2 P-V (e.g., at data point 1201 in FIG. 12A) to about 2.75 P-V (e.g., at data point 1203 in FIG. 12A) across the same range of torque applied. Indeed, the results are of a significant statistical and practical advantage because by making the subject structural change (i.e., by adding a groove or relief 94a to the protruding member or post 90 as shown in member 90a of FIGS. 6-7), which is an inexpensive and unique modification, the stresses/forces affecting a connected optical structure are significantly reduced. Not only are the results quite critical and significant statistically, thereby evidencing nonobviousness, but making such a modification is also unique and nonobvious because those skilled in the art would be deterred from making the subject modification. Specifically, those skilled in the art would be concerned with improving stability and stiffness of the optical mount assembly, and would, therefore, avoid compromising the structural integrity of the protruding member, the optical structure, the mount and/or the overall assembly by adding a groove, such as groove 94a. Thus, making such a groove proceeds contrary to accepted wisdom in the field of optics, and further supports the unique, nonobvious nature of one or more aspects of the present invention.

Additionally, the use of the groove/relief 94a provides an assembly for achieving dimensional stability and permits the hard mounts to maintain any provided degree of flatness (e.g., less than about $\lambda/4$; at least about $\lambda/4$, at least about $\lambda/10$, between about $\lambda/4$ and about $\lambda/30$, greater than $\lambda/30$, etc.) and more particularly, to maintain a high degree of flatness (e.g., at least about $\lambda/20$, at least about $\lambda/15$, between about $\lambda/15$ and about $\lambda/20$, between about $\lambda/15$ and about $\lambda/30$, etc.) after the mount is constructed, especially when using any clamping forces, rotating forces (such as torque), etc.

Figure 8:
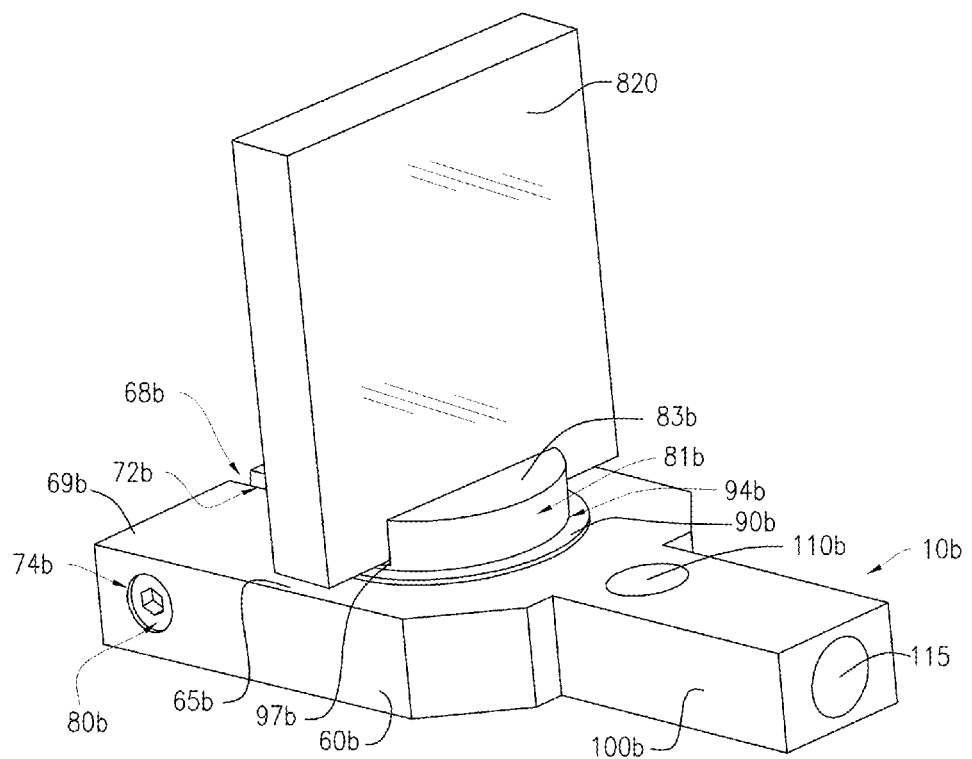
FIG. 8 is a perspective view of yet a further embodiment of a mount, optical structure comprising an optical filter and screw, in accordance with one or more embodiments of the present invention.
Figure 9:
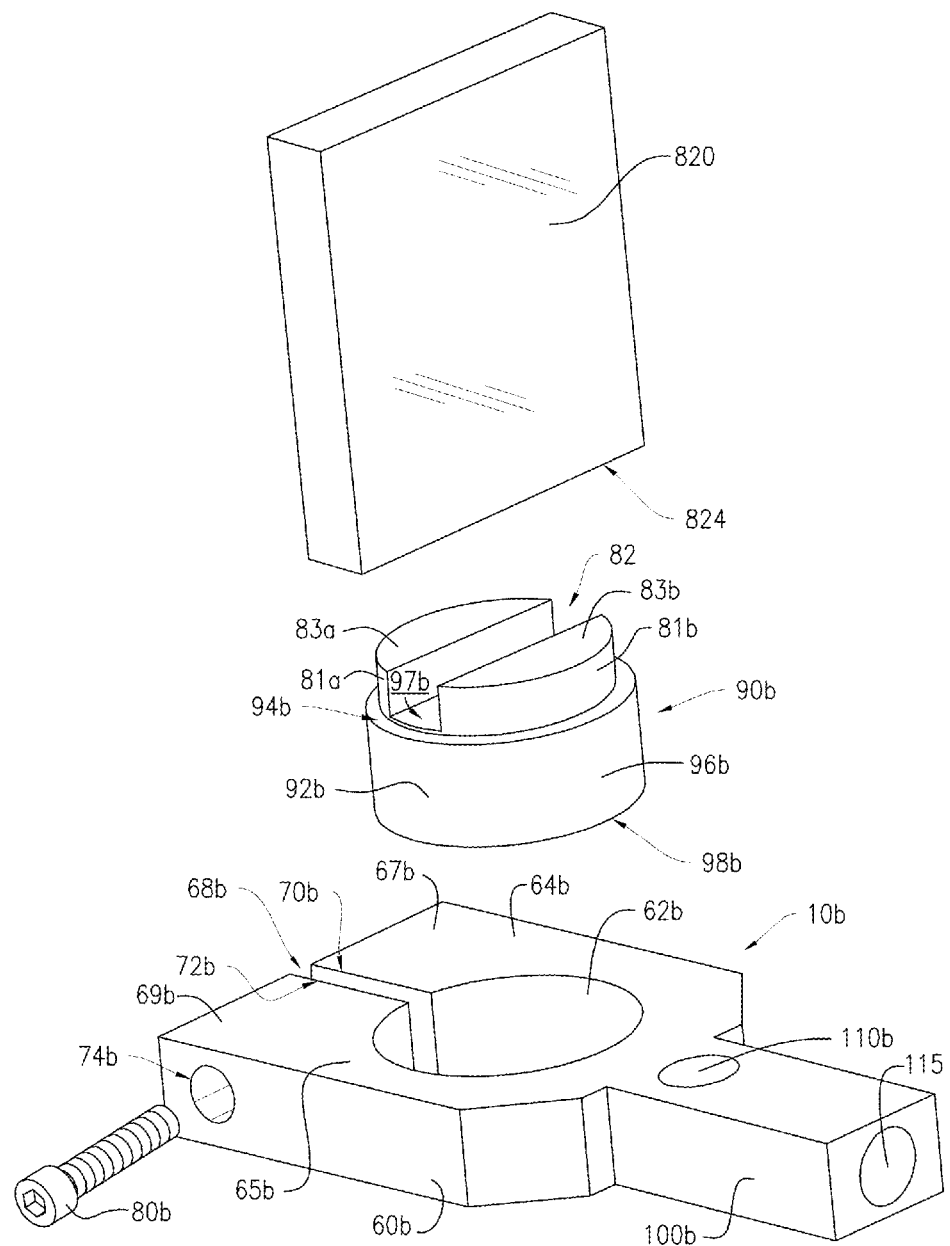
FIG. 9 is an exploded perspective view of the structures of FIG. 8.

In accordance with at least another embodiment of the present invention, the optical structure may comprise a mirror/reflective/refractive panel or an optical filter 820 having a protruding member 90b as shown in FIGS. 8-9. The optical filter 820 may be a flat piece of glass, and the protruding member 90b may have a groove 94b and a top surface 97b such that the bottom surface 824 of the optical filter 820 sits on top of the top surface 97b. The optical filter 820 may be connected (e.g., via fusing, bonding, adhering, etc.) to the member 90b, e.g., in similar fashion to optical structure 20 being connected to the member 90, 90a as discussed above. As best seen in FIG. 9, the groove 94b may be fashioned geometrically to stop at top surface 97b and two extensions 81a, 81b may extend from the top surface 97b of the member 90b to define a recess 82 therebetween. The recess 82 permits the optical filter 820 to sit therein. Preferably, the optical filter 820 is sufficiently located in the recess 82 to be properly positioned and/or centered, e.g., in a centering mechanism, for the connection process to the member 90b, e.g., via fusing, adhering, etc. The extensions 81a, 81b may be hemispherical in geometry (as shown in FIGS. 8-9), or may be any other geometry to maintain the principles and aspects of the present invention discussed herein. Preferably, the extensions 81a, 81b are sized and shaped such that they do not increase the surface area and/or the diameter of the top surface 97b that would exist if such extensions 81a, 81b were not used. For example, a surface area and/or diameter of the combined areas of the top surface 83a of the extension 81a, the top surface 83b of the extension 81b and the top surface 97b of the member 90b (i.e., the base of recess 82) that is shown in FIG. 9 may be substantially the same or smaller than a surface area and/or diameter of the top surface 97b that would exist without the use of the extensions 81a, 81b (e.g., if the extensions 81a, 81b were removed or not used, the top surface 97b may extend to the groove 94b substantially all along the perimeter of the groove 94b). The extensions 81a, 81b may be made of substantially similar material to that of member 90b and may be connected such that the extensions become integral thereto (e.g., via fusing). Also, the extensions 81, 81b may be adhered to, connected to or fused to the member 90b without being integral thereto. Alternatively, as similarly discussed above for the members 90, 90a, the member 90b and/or the groove 94b thereof may be created by any method known to one skilled in the art, including, but not limited to, grinding, etching, laser etching, cutting, etc. In at least one embodiment, the member 90b may be created, e.g., via etching, grinding, cutting, etc., such that the groove 94b and the extensions 81a, 81b are already integral thereto (e.g., the groove 94b and the extensions 81a, 81b may be etched from a large piece that is sized and shaped to form the member 90b).

The member 90b may be connected (e.g., via clamping, tightening, etc.) to a mount 10b, e.g., in similar fashion to member 90, 90a being connected to mount 10, 10a as discussed above. Indeed, those skilled in the art will appreciate that the elements (e.g., upper element 60b; opening 62b; arms 64b, 65b; head portions 67b, 69b; ends 70b, 72b of head portions 67b, 69b; opening 74b; base element 100b; opening 110b in the base element 100b; etc.) of the mount 10b may operate in similar fashion to those like-numbered elements (e.g., substantially same numbers but with a letter such as 10 and 10a, 96 and 296 discussed below, etc.) of mounts 10, 10a as discussed above or any additional like-numbered elements discussed further herein below. For example, a tightening mechanism 80b (which may operate in a similar fashion as tightening mechanism 80) may be screwed into aperture 74b such that ends 70b, 72b of heads 67b, 69b of arms 64b, 65b, respectively, are drawn together around at least a portion, e.g., base portion 96b, of the member 90b when the member 90b is placed into opening 62b of upper element 60b of the mount 10b.

Figure 4A:
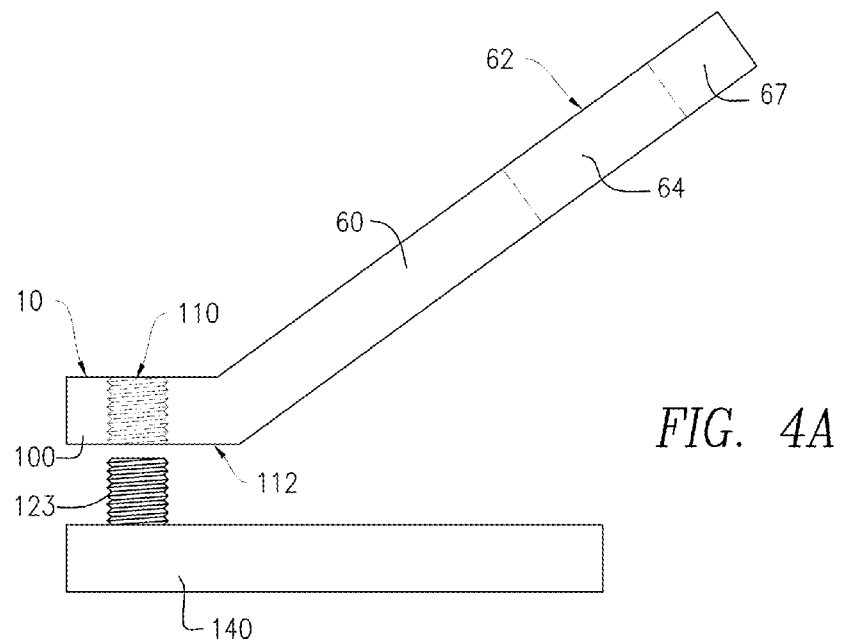
FIG. 4A is a side view of the mount 10 of FIG. 1 along with another structure having a threaded member extending therefrom in accordance with one or more embodiments of the present invention.
Figure 4B:
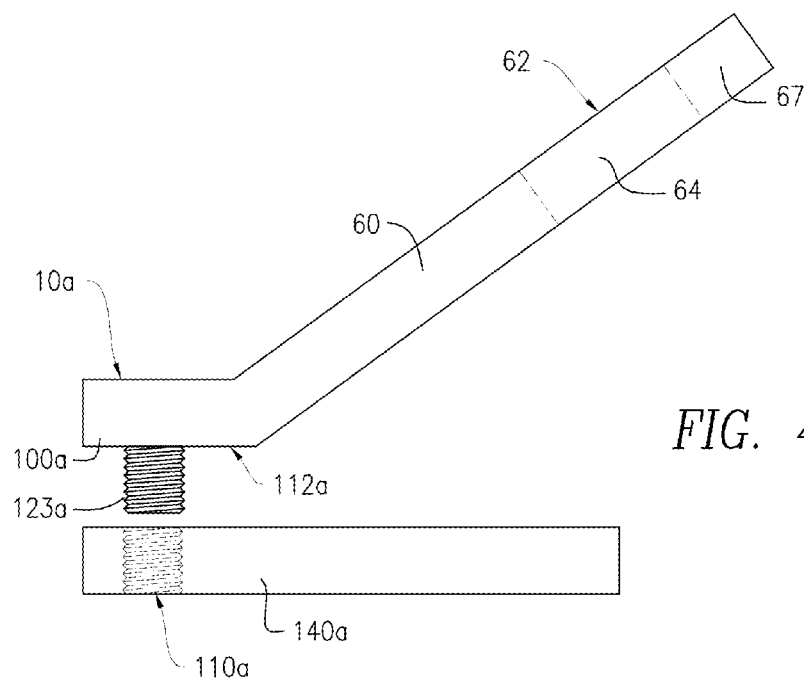
FIG. 4B is a side view of an alternative embodiment for a mount having a threaded member extending therefrom along with another structure having a threaded opening therethrough in accordance with one or more embodiments of the present invention.

Additionally, the mount 10b may be connected to another structure (e.g., another structure 140 as shown in FIG. 4A, another structure 140a as shown in FIG. 4B, etc.) via an element (e.g., a pin; an extending member, such as the extending member 123 of FIG. 4A or the extending member 123a of FIG. 4B; etc.) extending through the opening 110b or opening 115 of the base element 100b. Additionally or alternatively, the mount 10b may include a base element 100b extending from the upper element 60b and having a relatively smaller volume than the volume of the upper element 60b such that the base element may be easily connected, e.g. via clamping, compressing, etc. to another structure. Such a structure may lessen the force/stress on the optical filter glass 820 because any clamping, compressing, etc. of the base element 100b is limited by the reduced/smaller volume of the base element 100b. The base element 100b and the upper element 60b may be connected such that the base element 100b and the upper element 60b are substantially co-linear and/or co-planar (e.g., the base element 100b extends from the upper element 60b at substantially an angle of about 180 degrees). Additionally or alternatively, the base element 100b may include any geometric shape, e.g., the surfaces are chamfered, sloped, tapered, etc., such that the surface of the base element 100b that is ultimately clamped or otherwise connected to another structure is reduced. Alternatively, the base element 100b and the upper element 60b may be connected at an angle in similar fashion to the upper element 60, 60a and the base element 100, 100a as discussed above and shown in FIGS. 1-2 and 4A-4B.

Figure 10A:
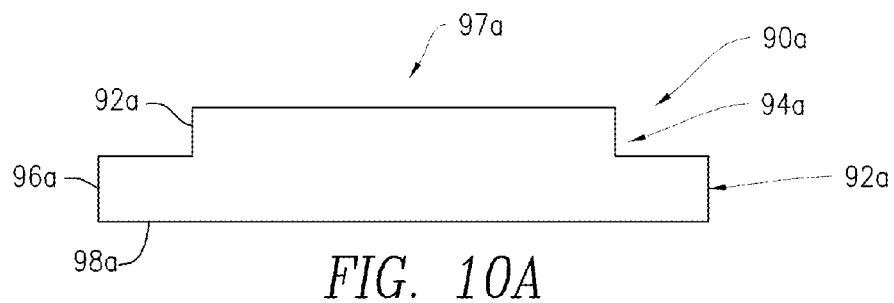
FIGS. 10A-10F are cross-sectional views taken along the diameter of various embodiments of the protruding member employing different geometrical shapes for the groove/relieved portion thereof in accordance with one or more embodiments of the present invention.

In accordance with at least one embodiment of the present invention, the groove/relief 94a, 94b of the protruding member 90a, 90b may be any geometric shape, including, but not limited to, circular, ovular, rectangular, square-shaped, etc., and may include slopes, chamfered surfaces, tapers, etc. For example, as shown in the embodiment of FIGS. 6-7, the embodiment of FIGS. 8-9 and FIG. 10A, the groove 94a, 94b may extend circularly around the perimeter of the member 90a, 90b and is formed at substantially a right angle such that the outer surface 92a, 92b of the member 90a, 90b extends inward (e.g., substantially parallel to the top 97a, 97b and bottom surfaces 98a, 98b of the member 90a, 90b) from the top of the base portion 96a, 96b and then extends vertically substantially at a right angle or perpendicular to the top surface 97a, 97b and bottom surface 98a, 98b of the member 90a, 90b.

Figure 10B:
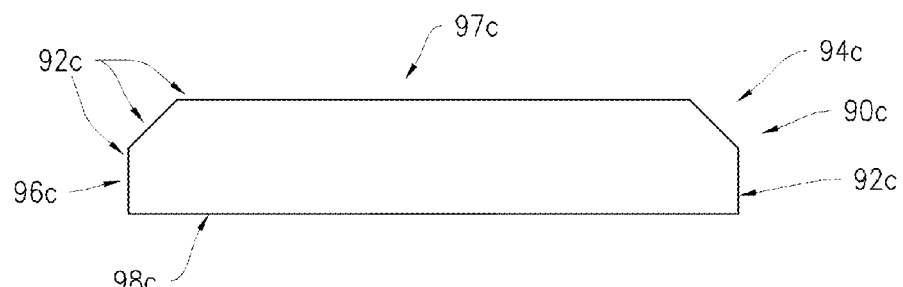
Figure 10C:
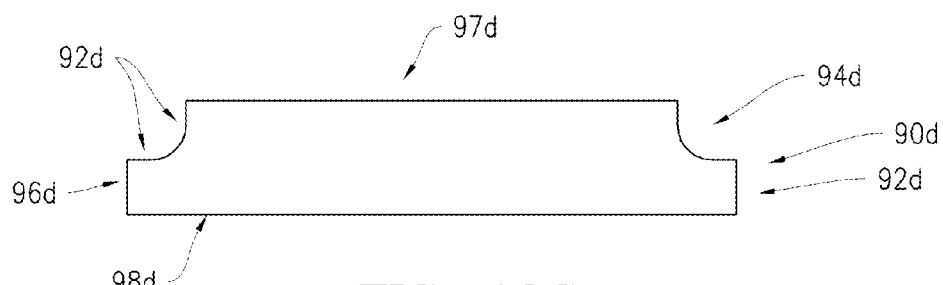
Figure 10D:
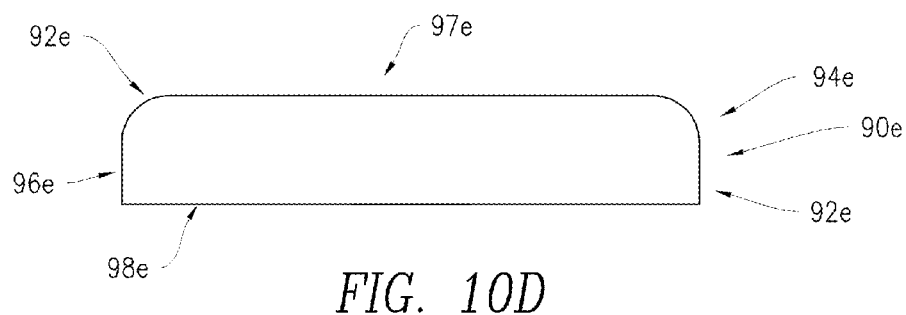
Figure 10E:
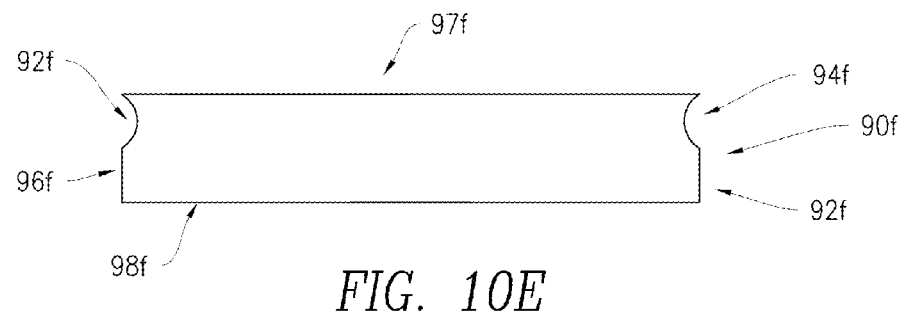

Alternatively, as shown in FIGS. 10B-10E, a groove, such as grooves 94a, 94b of any protruding member, such as protruding members 90a, 90b, may employ different geometrical shapes for the groove/relieved portion thereof in accordance with one or more embodiments of the present invention. As shown in FIG. 10B, the groove 94c is formed from a chamfered surface having a consistent slope extending from the base portion 96c of the member 90c to the top surface 97c thereof. The groove 94c may extend substantially around the perimeter of the member 90c. As shown in FIG. 10C, the groove 94d is formed from a chamfered surface having a changing convex slope extending from the base portion 96d of the member 90d to the top surface 97d thereof. The groove 94d may extend substantially around the perimeter of the member 90d. Alternatively, as shown in FIG. 10D, the chamfered surface may have a concave slope extending from the base portion 96e of member 90e to the top surface 97e thereof. The groove 94e may extend substantially around the perimeter of the member 90e. Additionally, as shown in FIG. 10E, the chamfered surface may have a concave slope extending from the base portion 96f of member 90f to the top surface 97f thereof such that the surface area and/or diameter of the top surface 97f may have substantially the same surface area and/or diameter of a lateral cross-section of the base portion 96f. Several lateral cross-sections of the member 90f that are located above the base portion 96f may have a surface area and/or diameter that are smaller than the surface area and/or diameter of the lateral cross-section of the base portion 96f. Additionally, the volume of the portion of the member 90f located above the base portion 96f may be smaller than the volume of the base portion 96f. The groove 94f may extend substantially around the perimeter of the member 90f While it is preferred that the geometry of the groove 94a-f corresponds to the geometry of the member 90a-f and the opening 62, 62b (e.g., if the opening 62, 62b and the member 90a-f are circular, then the groove 94a-f may be circular such that the groove 94a-f extends circularly substantially around the perimeter of the member 90a-e), it is not mandatory. For example, even if the opening 62, 62b and the member 90a-f are circular, the groove 94a-f may be ovular, rectangular, form pillars on top of the base portion 96a-f of the member 90a-f (e.g., such that the top of the member 90a-f resembles a "button" when viewed from above), etc.

Figure 10F:
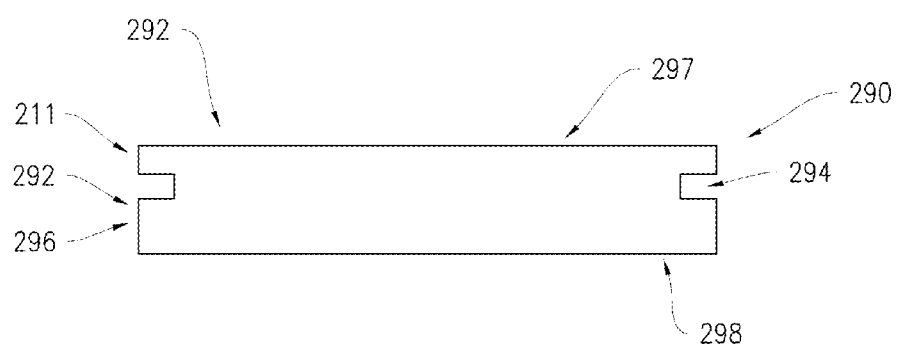
Figure 11A:
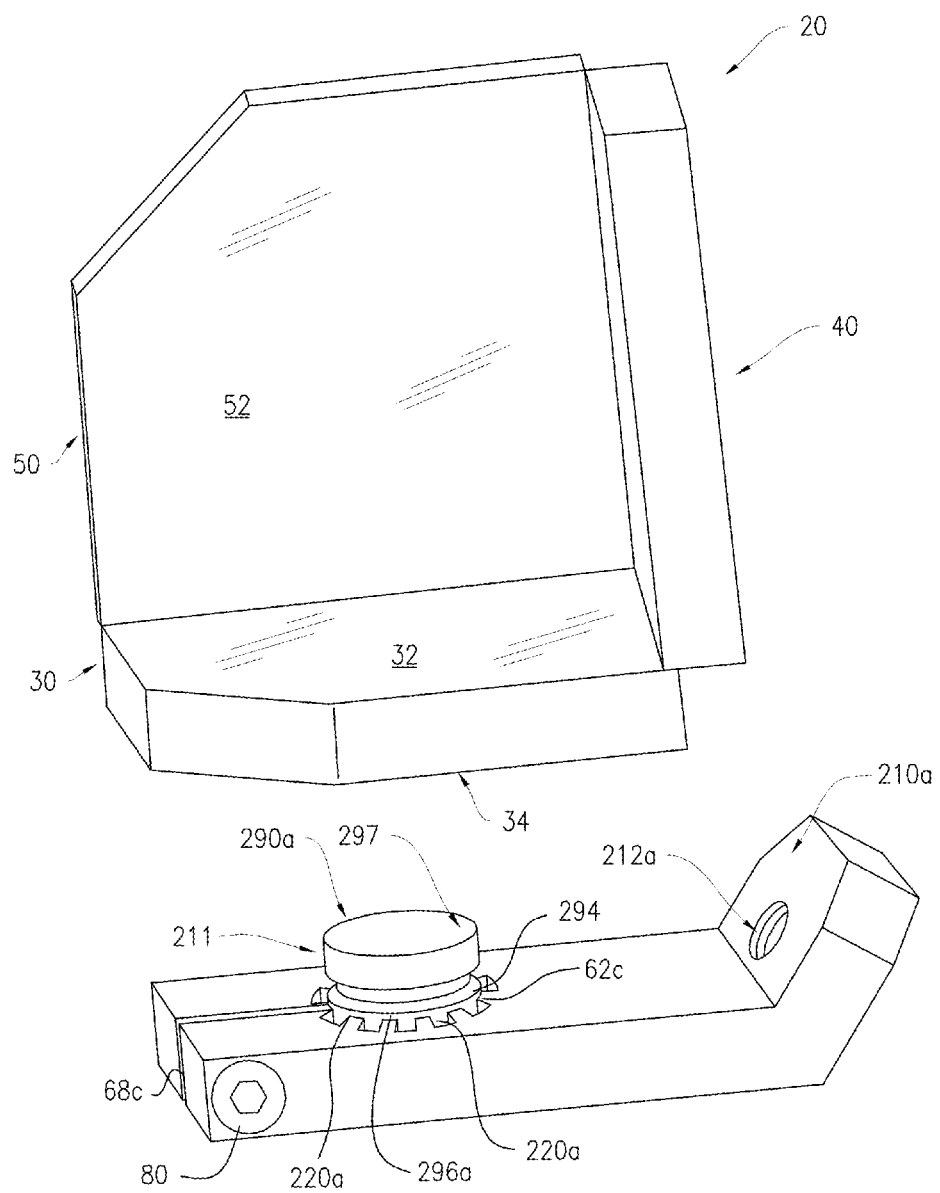
FIG. 11A is a perspective view of at least an additional aspect of the protruding member having a groove spaced away from the optical structure, where the optical structure is shown in an exploded view from the protruding member, and used in tandem with a mount having radial reliefs spaced around, and in communication with, a recess of the mount in accordance with one or more embodiments of the present invention.
Figure 11B:
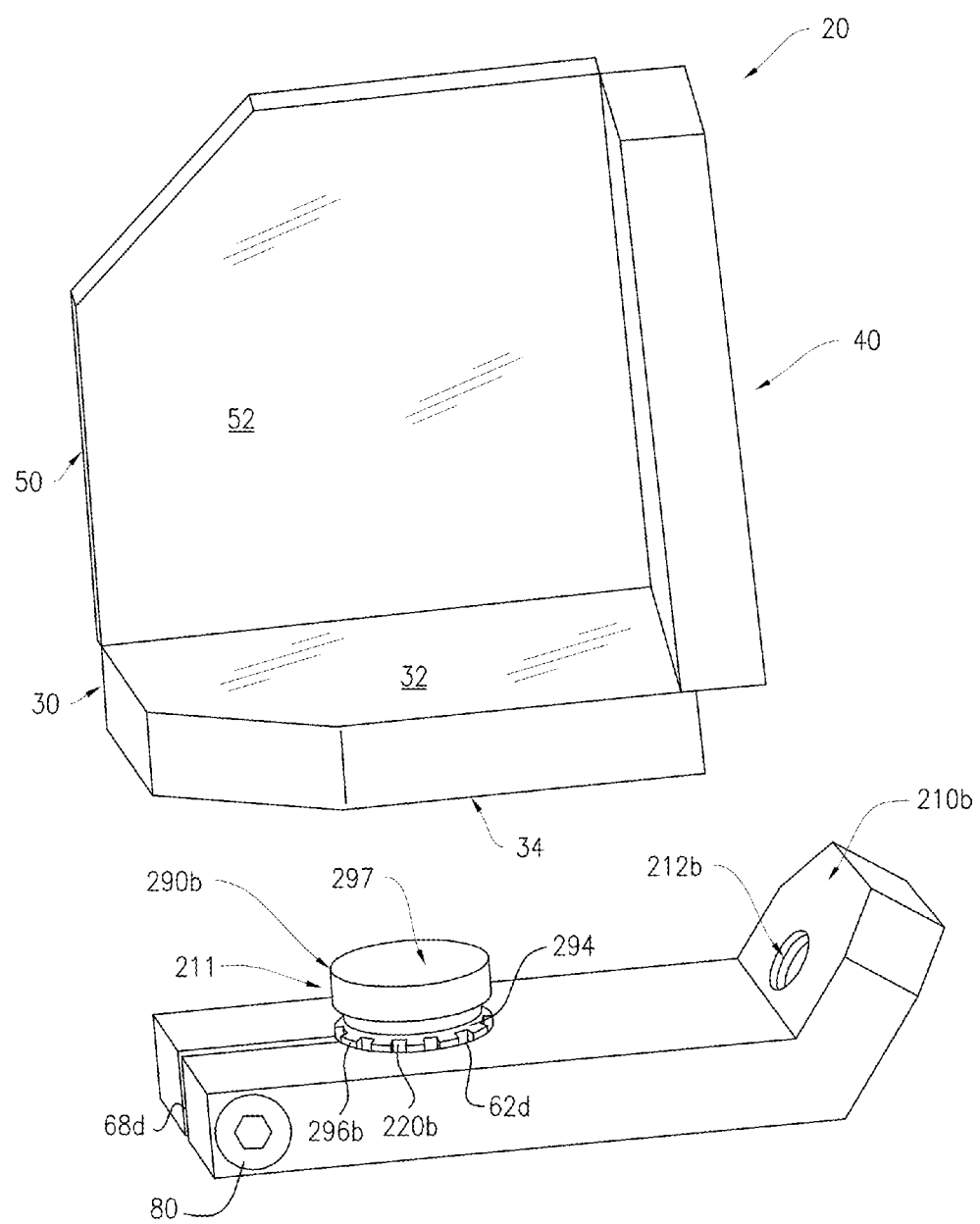
FIG. 11B is a perspective view of at least an additional aspect of the protruding member having a groove spaced away from the optical structure, where the optical structure is shown in an exploded view from the protruding member, and having radial reliefs disposed around a bottom portion of the protruding member placed in recess of the mount in accordance with one or more embodiments of the present invention.

Additionally or alternatively, as shown in FIG. 10F, a groove, such as groove 294 of any protruding member, such as protruding member 290, 290a, 290b, may be spaced away from the top surface 297 of the protruding member, and is, therefore, spaced away from any optical structure, such as optical structure 20 (e.g., the bottom surface 34 of the optical element 30 of the optical structure 20), that may be attached to the top surface 297 thereof. The groove 294 may employ different geometrical shapes for the groove/relieved portion thereof in accordance with one or more embodiments of the present invention. For example, as shown in the embodiments of FIGS. 11A and 11B (discussed further below) and in FIG. 10F, the groove 294 may extend circularly around the perimeter of the member 290, 290a, 290b and may be formed at substantially a right angle such that the outer surface 292 of the member 290, 290a, 290b extends inward (e.g., substantially parallel to the top 297 and bottom surface 298 of the member 290, 290a, 290b) from the top of the base portion 296, 296a, 296b and then extends vertically at substantially a right angle or perpendicular to the top surface 297 and bottom surface 298 of the member 290, 290a, 290b. Then, the outer surface 292 extends outwardly at substantially a right angle or perpendicular to the top surface 297 and the bottom surface 298. Once the outer surface has extended outwardly to the point where the diameter of the portion (e.g., top portion 211 as discussed further below with reference to FIGS. 11A-11B) of the member 290, 290a, 290b above the groove 294 is substantially equal to (although, alternatively, such an extension may occur where the diameter of the portion of the member 290, 290a, 290b is smaller than or larger than) the diameter of the bottom portion 296, 296a, 296b, then the surface 292 extends vertically for a predetermined distance at substantially a right angle or perpendicular to the top surface 297 and bottom surface 298. Once the surface 292 extends for the predetermined distance, the surface extends inward again such that the surface 292 defines the top surface 297 of the member 290, 290a, 290b. Preferably, the top surface 297 is substantially parallel to the bottom surface 298 of the member 290, 290a, 290b. This structure provides, and defines, a portion (e.g., top portion 211 as discussed further below with reference to FIGS. 11A-11B) of the member 290, 290a, 290b that is located above the groove 294 where that portion may be smaller than (as shown in FIG. 10F), substantially equal to, or larger than the bottom portion 296, 296a, 296b. Alternatively, the groove 294 of the member 290, 290a, 290b may have a chamfered or concave slope as similarly shown for the groove 94c-94f in FIGS. 10B-10E. Preferably, the top surface 297 has a surface area and/or diameter that is substantially the same as the surface area and/or diameter of a lateral cross-section of the base portion 296, 296a, 296b or of the bottom surface 298 of the member 290, 290a, 290b. Preferably, one or more lateral cross-sections of the portion (e.g., top portion 211 as shown in FIGS. 11A-11B) of the member 290, 290a, 290b located between the groove 294 and the top surface 297 have a surface area and/or diameter that is substantially the same as the surface area and/or diameter of a lateral cross-section of the base portion 296, 296a, 296b or of the bottom surface 298 of the member 290, 290a, 290b. Preferably, the volume of the portion (e.g., top portion 211 as shown in FIGS. 11A-11B) of the member 290, 290a, 290b located between the groove 294 and the top surface 297 has a volume that is smaller than the volume of the bottom portion 296, 296a, 296b. Additionally or alternatively, the surface area (of the entire portion, such as the top portion 211, or of one or more lateral cross-sections of the portion, such as the top portion 211), the diameter and/or the volume of the portion of the member 290, 290a, 290b located between the groove 294 and the top surface 297 may be smaller than, equal to or larger than the surface area (of the entire bottom portion 296, 296a, 296b or of one or more lateral cross-sections of the bottom portion 296, 296a, 296b), the diameter and/or the volume of the bottom portion 296, 296a, 296b of the member 290, 290a, 290b.

While it is preferred that the geometry of the groove 294 corresponds to the geometry of the member 290, 290a, 290b and the opening 62, 62b, 62c, 62d (e.g., if the opening 62, 62b, 62c, 62d and the member 290, 290a, 290b are circular, then the groove 294 may be circular such that the groove 294 extends circularly substantially around the perimeter of the member 290, 290a, 290b), it is not mandatory. For example, even if the opening 62, 62b, 62c, 62d and the member 290, 290a, 290b are circular, the groove 294 may be ovular, rectangular, form pillars on top of the base portion 296, 296a, 296b of the member 290, 290a, 290b (e.g., such that the top of the member 290, 290a, 290b resembles a "button" when viewed from above), etc.

In accordance with at least another embodiment of the present invention, a groove, such as groove 294 or groove 94a-94f, of a protruding member 290, 290a, 290b may be shifted or spaced away from an optical structure, such as the optical structure 20, connected to the protruding member 290, 290a, 290b as shown in FIGS. 10 and 11A-11B. By shifting away (or spacing away) the groove 294 from the optical structure 20 (e.g., the groove 294 may be disposed at a location along the protruding member 290, 290a, 290b that is at a predetermined distance from a surface of the protruding member 290, 290a, 290b that is in contact with the optical structure, such as optical structure 20), any pressure or stresses (e.g., sheer forces, rotational forces, compression forces, etc.) that would normally pass through the protruding member 290, 290a, 290b and to the optical structure 20 (e.g., when a post or protruding member does not include a groove) are instead substantially concentrated and/or localized at the groove 294, thereby substantially reducing and/or eliminating such pressure or stresses from affecting the optical structure 20. The location where the pressure or stresses are localized (e.g., at groove 294) may be located further away from the optical structure 20 (e.g., as compared to an assembly having a groove closer to the optical structure, such as, but not limited to, the assembly of FIGS. 6-7, the assembly of FIGS. 8-9, etc.). Preferably, when the groove 294 is spaced away from the optical structure 20 (e.g., the groove is located substantially near or in the middle of the protruding member 290, 290a, 290b; the groove 294 may be disposed at a location along the protruding member 290, 290a, 290b that is at a predetermined distance from a surface of the protruding member 290, 290a, 290b that is in contact with the optical structure 20; the groove 294 is located towards the mount 210a, 210b rather than towards the optical structure 20; the groove 294 is not directly adjacent to the optical structure 20; the groove is located towards the optical structure 20 rather than towards the mount 210a, 210b; etc.), the groove 294 defines a first portion 211 (also referred to as "a top portion 211") that connects to the optical structure 20 and a second portion 296, 296a, 296b (also referred to as "a bottom portion 296, 296a, 296b") that is disposed within a recess 62c, 62d of the mount 210a, 210b as best seen in FIGS. 11A-11B. Preferably, the groove 294 extends laterally along the protruding member 290, 290a, 290b and defines the first portion 211 and the second portion 296, 296a, 296b on each side of the groove 294. The first portion 211 may be sized and shaped to be smaller, substantially the same size and/or larger than the second portion 296, 296a, 296b. Regardless of the size and shape of the first portion 211 to the second portion 296, 296a, 296b, the groove 294 operates to substantially reduce and/or eliminate pressure or stresses affecting the optical structure 20.

The groove 294 may be formed (e.g., sized and shaped) and may operate to achieve the advantages, surprising results, and unique, nonobvious properties as similarly explained above with respect to the grooves 94a-94f (as shown in FIGS. 10A-10E). For example, the groove 294 may operate to: (i) concentrate any stress or force from the mount 210a, 210b onto the member 290, 290a, 290b rather than directly onto the optical structure 20; (ii) reduce/dissipate and/or eliminate any resulting stress or force from distorting, or otherwise affecting, the optical structure 20; and may preserve and/or maintain the provided flatness, such as, but not limited to, a high degree of flatness as discussed herein. When the mount is assembled such that the top portion 211 of the member 290, 290a, 290b is connected/fused to the optical structure 20 (e.g., connected/fused to the bottom surface 34 of the optical element 30 of the optical structure 20) and the base portion 296, 296a, 296b of the member 290, 290a, 290b is tightened/clamped within the recess 62c, 62d of the mount 210a, 210b, various types of stresses affect the assembly, including, but not limited to, tightening/clamping stress in the mount 210a, 210b, stress from rotation/tightening of the element 80 within mount 210a, 210b, etc. However, because the member 290, 290a, 290b includes the groove 294, such stresses that would otherwise be affecting the optical structure 20 more greatly are instead surprisingly and significantly dissipated/reduced and/or eliminated.

The aforementioned unexpected and critical reduction and/or elimination of various forces/stresses on the optical structure is evidenced by the additional experiment performed to compare the torque, and mirror (or optical) distortion resulting therefrom, affecting an optical structure having a protruding member without a groove (also referred to as a "Solid Post") (e.g., similar to the structure as shown in FIG. 1) with the torque, and mirror (or optical) distortion resulting therefrom, affecting an optical structure having a protruding member with a groove spaced away from an optical structure (also referred to as a "Relieved Post") (e.g., as shown in FIG. 11A but with the optical structure 20 (e.g., the bottom surface 34 of the optical element 30 of the optical structure 20) connected to the top surface 297 of the protruding member 290a, FIG. 11B but with the optical structure 20 (e.g., the bottom surface 34 of the optical element 30 of the optical structure 20) connected to the top surface 297 of the protruding member 290b, FIG. 11A but with the optical structure 20 (e.g., the bottom surface 34 of the optical element 30 of the optical structure 20) connected to the top surface 297 of the protruding member 290a and without the reliefs 220a, FIG. 11B but with the optical structure 20 (e.g., the bottom surface 34 of the optical element 30 of the optical structure 20) connected to the top surface 297 of the protruding member 290b and without the reliefs 220b, etc.). The results of the experiment are illustrated in FIG. 13 and in the table as follows:

| in-oz Torque | Solid Post PV | Relieved Post PV |
| --- | --- | --- |
| 0 | 0.294 | 0.142 |
| 16 | 0.286 | 0.144 |
| 24 | 0.541 | 0.162 |
| 32 | 0.832 | 0.159 |
| 40 | 1.005 | 0.177 |
| 48 | 1.162 | 0.168 |
| 60 | 1.53 | 0.16 |
| 80 | 1.859 | 0.198 |
| 100 | 2.361 | 0.2 |

Figure 13:
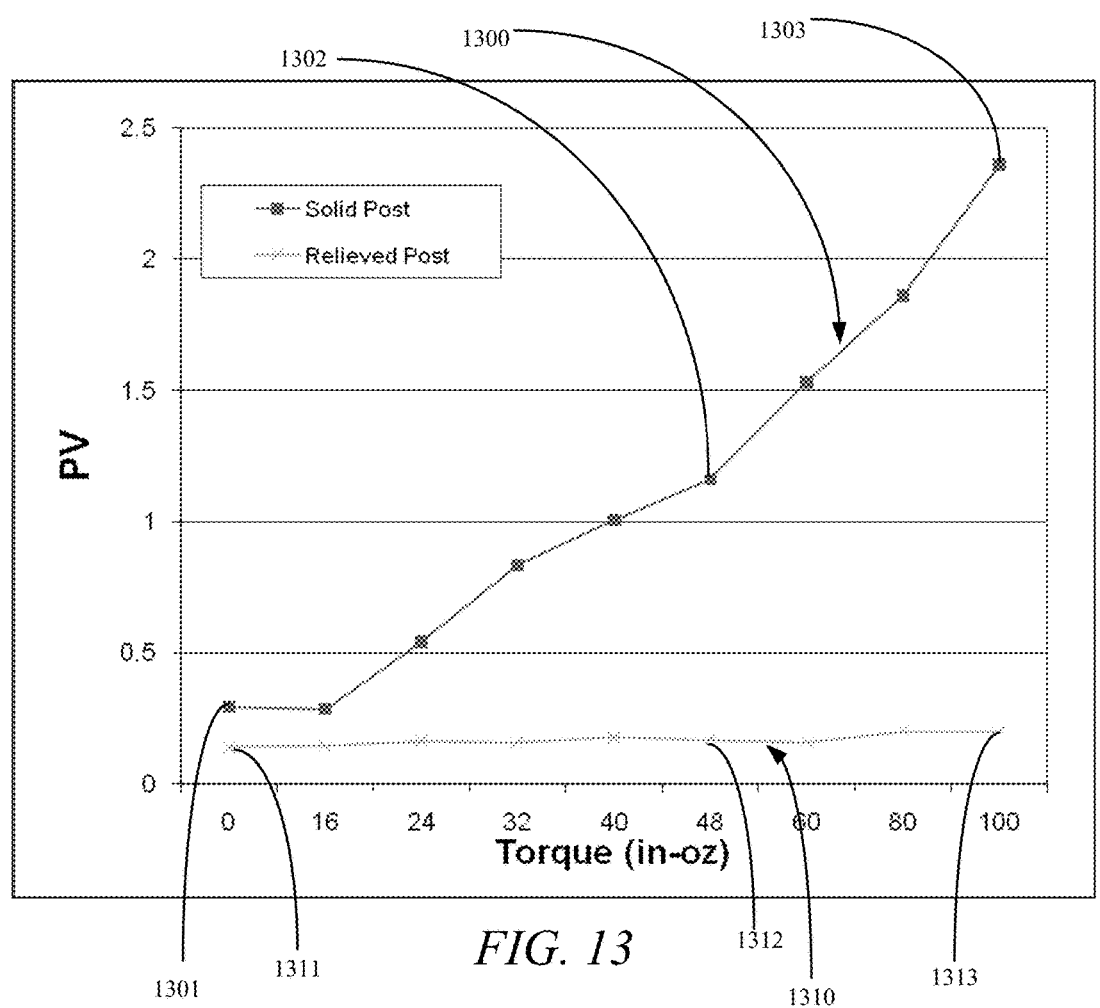
FIG. 13 is a graph illustrating the unexpected and critical reduction and/or elimination of various forces/stresses on the optical structure by another experiment performed to compare the torque, and mirror (or optical) distortion resulting therefrom, affecting an optical structure having a protruding member without a groove (also referred to as a "Solid Post"; data shown in curve 1300 of FIG. 13) with the torque, and mirror (or optical) distortion resulting therefrom, affecting an optical structure having a protruding member with a groove spaced away from the optical structure (also referred to as a "Relieved Post"; data shown in curve 1310 of FIG. 13).

As shown from the "Solid Post" curve 1300 in FIG. 13, the mirror distortion ("P-V" or "peak-to-valley") ranged from about 0.294 P-V at a torque of zero inch-ounces (or "in-oz") (see data point 1301 on curve 1300 in FIG. 13) to about 2.361 P-V at a torque of 100 inch-ounces (see data point 1303 on curve 1300 in FIG. 13). At a torque value of 48 inch-ounces (e.g., about middle of the range measured), the mirror distortion was measured at 1.162 P-V (see data point 1302 on curve 1300 in FIG. 13).

In contrast, as shown from the "Relieved Post" curve 1310 in FIG. 13, the mirror distortion ("P-V" or "peak-to-valley") ranged from about 0.142 P-V at a torque of zero inch-ounces (or "in-oz") (see data point 1311 on curve 1310 in FIG. 13) to about 0.2 P-V at a torque of 100 inch-ounces (see data point 1313 on curve 1310 in FIG. 13). At a torque value of 48 inch-ounces (e.g., middle of the range measured), the mirror distortion was measured at about 0.168 P-V (see data point 1312 on curve 1310 in FIG. 13).

The mount used for the "Solid Post" experiment (e.g., results of which are illustrated via curve 1300 in FIG. 13) is substantially similar or identical to, and is, therefore, representative of the mount depicted in FIG. 1 or variations thereof in accordance with one or more aspects of the present invention. Similarly, the mount used for the "Relieved Post" experiment (e.g., results of which are illustrated via curve 1310 in FIG. 13) is substantially similar or identical to, and is, therefore, representative of the mount(s) depicted in FIG. 11A, FIG. 11B or variations thereof (e.g., as shown in FIGS. 11A-11B but with the optical structure 20 (e.g., the bottom surface 34 of the optical element 30 of the optical structure 20) connected to the top surface 297 of the protruding member 290a, 290b and without the reliefs 220a, 220b) in accordance with one or more aspects of the present invention. Indeed, the results of the "Solid Post" and "Relieved Post" experiment (e.g., as illustrated via curves 1300 and 1310, respectively, in FIG. 13) are representative of various embodiments in accordance with one or more aspects of the present invention. Thus, these results: (i) illustrate practical conditions; (ii) are representative general conditions when dealing with such optics; and (iii) also indicate that the addition of the groove is unique, achieves critical results/advantages, thereby supporting the groove modification as being novel and nonobvious.

The experimental data clearly indicates the critical improvement of employing a protruding member (or post) having a groove (or relief) spaced away from an optical structure instead of a protruding member (or post) without a groove (or relief). For example, when comparing the mirror distortions that occurred at the two torque values of 48 inch-ounces (i.e., about 1.162 P-V for Solid Post and about 0.168 P-V for Relieved Post with spaced away groove; see data point 1302 of curve 1300 in FIG. 13 and data point 1312 of curve 1310 in FIG. 13, respectively) and 100 in-oz (i.e., about 2.361 P-V for Solid Post and about 0.2 P-V for Relieved Post with spaced away groove; see data point 1303 of curve 1300 in FIG. 13 and data point 1313 of curve 1310 in FIG. 13, respectively), the Solid Post assembly exhibited mirror distortions that were about 692% greater and 1180.5% greater, respectively, than the mirror distortions of the Relieved Post assembly with the spaced away groove. Such results were quite surprising and greater than any expected reduction in mirror distortions due to the addition of the groove, where the groove was spaced away from the optical structure 20. Specifically, it is quite surprising that the distortion for the Relieved Post is consistently and minimally/barely increasing from about 0.142 P-V to about 0.2 P-V (see curve 1310 in FIG. 13) across the entire range of torque applied whereas the distortion for the Solid Post discussed above is much more erratic and increases greatly, especially beyond 16 inch-ounces and towards the higher end of the torque applied, from about 0.294 P-V to about 2.361 P-V (see curve 1300 in FIG. 13). Indeed, the results are of a significant statistical and practical advantage because by making the subject structural change (i.e., by adding a groove or relief 294 to the protruding member or post 290, 290*a*, 290*b* that is spaced away from the optical structure 20 as shown in FIG. 10 and FIGS. 11A-11B but with the optical structure 20 (e.g., the bottom surface 34 of the optical element 30 of the optical structure 20) connected to the top surface 297 of the protruding member 290*a*, 290*b*), which is an inexpensive and unique modification, the stresses/forces affecting a connected optical structure, such as optical structure 20, are significantly reduced. Not only are the results quite critical and significant statistically, thereby evidencing nonobviousness, but making such a modification is also unique and nonobvious because those skilled in the art would be deterred from making the subject modification. As explained above, those skilled in the art would be concerned with improving stability and stiffness of the optical mount assembly, and would, therefore, avoid compromising the structural integrity of the protruding member, the optical structure, the mount and/or the overall assembly by adding such a groove. Thus, making such a groove proceeds contrary to accepted wisdom in the field of optics, and further supports the unique, nonobvious nature of one or more aspects of the present invention.

In accordance with at least another embodiment of the present invention, one or more reliefs 220*a*, 220*b* (also referred to as notches or depressions 220*a*, 220*b*) may be disposed/formed either in/on (e.g., in communication with, as part of, etc.) the perimeter of the recess 62*c* of the mount 210*a* (best seen in FIG. 11A) or may be formed on/in/around the perimeter (e.g., in communication with, as part of, etc.) of the bottom portion, such as bottom portion 296*b*, of the protruding member, such as protruding member 290*b* (best seen in FIG. 11B), thereby reducing physical contact, and, thus, the transfer of pressure or stresses/forces, between the mount 210*a*, 210*b* and the protruding member 290, 290*a*, 290*b*. Preferably, the one or more reliefs or notches comprise radial reliefs/notches 220*a*, 220*b*. Preferably, the reliefs/notches 220*a*, 220*b* are constructed (e.g., sized, shaped, etc.) in/on the protruding member 290*b* and/or in/on the mount 210*a* such that the reliefs/notches 220*a*, 220*b* permit the gaps 68*c*, 68*d* to function without interference (e.g., the gaps 68*c*, 68*d* may perform substantially similar or identical to gaps 68, 68*b* as discussed above). The reliefs/notches 220*a*, 220*b* may be created by any method known to one skilled in the art, including, but not limited to, grinding, etching, laser etching, cutting, etc.

The member 290, 290*a*, 290*b* may be connected (e.g., via clamping, tightening, etc.) to a mount 210*a*, 210*b*, e.g., in similar fashion to member 90, 90*a*, 90*b* being connected to mount 10, 10*a*, 10*b* as discussed above. Indeed, those skilled in the art will appreciate that the elements (e.g., upper portion 211; bottom portion 296, 296*a*, 296*b*; groove 294; opening 62*c*, 62*d*; opening 212*a*, 212*b* of mount 210*a*, 210*b*; etc.) of the protruding member 290, 290*a*, 290*b* and/or mount 210*a*, 210*b* may operate in similar or identical fashion to those respective elements of the protruding members 90*a*-90*f* (such as, but not limited to upper surface 97*a*-97*f*; bottom portion 96*a*-96*f*; groove 94*a*-94*f*; etc.) and/or of the mounts 10, 10*a*, 10*b* (such as, but not limited to opening 62, 62*b*; opening 74, 74*b*; opening 110; etc.) as discussed above or any additional like-numbered elements discussed further herein below.

Additionally, the mount 210*a*, 210*b* may be connected to another structure as discussed above (e.g., another structure 140 as shown in FIG. 4A, another structure 140*a* as shown in FIG. 4B, etc.) via an element (e.g., a pin; an extending member, such as the extending member 123 of FIG. 4A or the extending member 123*a* of FIG. 4B; etc.) extending through the opening 212*a*, 212*b* of the mount 210*a*, 210*b*. Additionally or alternatively, the mount 210*a*, 210*b* may include a base element, such as base element 100*b* shown in FIGS. 8-9, such that the base element may be easily connected, e.g. via clamping, compressing, etc. to another structure. Such structure may lessen the force/stress on the optical structure 20 attached to the mount 210*a*, 210*b*.

It will thus be seen that the objects set forth above, among those made apparent from the preceding description, are efficiently attained, and, since numerous/certain changes may be made in the above constructions without departing from the spirit and scope of the invention, it is intended that all matter contained in the above description and shown in the accompanying drawings shall only be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of mounting an optical structure, comprising the steps of:

forming an optical structure comprising at least one mirror panel, said at least one mirror panel having at least one reflective surface and at least one back surface substantially opposite said reflective surface, wherein said back surface has a protruding member being part of a mount for mounting said optical structure, said protruding member having a first portion extending from said back surface of said optical structure, a second portion, and a groove defining said first and second portions on each side of said groove such that said groove of said protruding member one of dissipates or eliminates one or more stresses passing through said mount and affecting said optical structure;

forming an upper element of said mount comprising a first opening extending therethrough, the first opening forming two arms in said upper element, each of said two arms having a head portion and ending at an end thereof;

sliding said first opening of said mount around or over at least said second portion of said protruding member; and tightening said first opening of said upper element of said mount around said at least said second portion of said protruding member by inserting a tightening mechanism into a second opening located through one of said head portions of said upper element and by further inserting and tightening said tightening mechanism into a third opening in said other head portion of said upper element so that said tightening mechanism draws said two ends of said head portions toward each other.

2. The method of mounting an optical structure as recited in claim 1, further comprising the step of integrally forming said protruding member with at least one of: said at least one mirror panel and said back surface of at least one mirror panel.

3. The method of mounting an optical structure as recited in claim 1, further comprising the step of bonding said first portion of said protruding member to said back surface of said at least one mirror panel.

4. The method of mounting an optical structure as recited in claim 1, said bonding comprising at least one of: fusing and adhering.

5. The method of mounting an optical structure as recited in claim 1, further comprising disposing said groove on said protruding member such that said first portion of said protruding member is smaller than said second portion of said protruding member.

6. The method of mounting an optical structure as recited in claim 5, further comprising:
placing a surface of said first portion of said protruding member in contact with said back surface of said optical structure; and
one of sizing or shaping said surface of said first portion of said protruding member such that said surface of said first portion has at least one of:
(i) a smaller diameter than one of a lateral cross-section or a bottom surface of said second portion of said protruding member that is disposed in said first opening of said upper element; and
(ii) a smaller surface area than one of a lateral cross-section or a bottom surface of said second portion that is disposed in said first opening of said upper element.

7. The method of mounting an optical structure as recited in claim 5, further comprising one of sizing or shaping at least one of said first portion of said protruding member and said second portion of said protruding member such that said first portion of said protruding member has a smaller volume than said second portion of said protruding member.

8. The method of mounting an optical structure as recited in claim 1, further comprising the step of forming a base element of said mount with said upper element of said mount.

9. The method of mounting an optical structure as recited in claim 8, said base element being formed integrally with said upper element.

10. The method of mounting an optical structure as recited in claim 8, further comprising the step of forming supporting means for said base element of said mount for securing said optical structure to a support structure.

11. The method of mounting an optical structure as recited in claim 10, wherein said supporting means comprises at least one of:
(i) a threaded member extending from said support structure for cooperative screwed attachment within a threaded opening in said base element; and
(ii) a threaded member extending from said base element for cooperative screwed attachment within a threaded opening in said support structure.

12. The method of mounting an optical structure as recited in claim 1, further comprising one of sizing or shaping said groove such that the groove is at least one of:
(i) a space between said optical structure and at least one of said second portion of said protruding member and said upper element of said mount such that said optical structure is spaced away from said at least one of said second portion of said protruding member and said upper element; and
(ii) operating to one of achieve or maintain at least one of:
dimensional stability, a predetermined degree of flatness and a high degree of flatness of at least one of: about $\lambda/10$, about $\lambda/15$, about $\lambda/20$, about $\lambda/30$, between about $\lambda/10$ and about $\lambda/15$, between about $\lambda/10$ and about $\lambda/20$, between about $\lambda/10$ and about $\lambda/30$, between about $\lambda/15$ and about $\lambda/20$, between about $\lambda/15$ and about $\lambda/30$ and between about $\lambda/20$ and about $\lambda/30$.

13. The method of mounting an optical structure as recited in claim 1, further comprising:
extending said groove of said protruding member along a perimeter of said first portion of said protruding member.

14. The method of mounting an optical structure as recited in claim 1, further comprising forming said groove at substantially a right angle such that a first portion of an outer surface of said protruding member extends from said second portion of said protruding member inwardly substantially parallel to said surface of said first portion of said protruding member and a second portion of said outer surface of said protruding member extends from the first portion of said outer surface vertically substantially at one of a right angle or perpendicular to said surface of said first portion of said protruding member.

15. The method of mounting an optical structure as recited in claim 1, further comprising:
forming at least two extensions that are in communication with said groove and are extending from said first portion of said protruding member such that a recess is defined between the at least two extensions for said optical structure to be positioned therein.

16. The method of mounting an optical structure as recited in claim 15, further comprising one of sizing or shaping said at least two extensions such that said at least two extensions at least one of: (i) do not extend outwardly beyond said first portion of said protruding member; and (ii) one of taper or slope inwardly away from said groove towards said optical structure.

17. The method of mounting an optical structure as recited in claim 1, further comprising forming one or more reliefs such that said one or more reliefs are in communication with at least one of:
  (i) said first opening, said one or more reliefs being positioned one of in or on a perimeter of said first opening and said one or more reliefs operating to reduce physical contact between one or more surfaces of said protruding member and one or more surfaces of said upper element of said mount, thereby one of reducing or eliminating transfer of one or more stresses between said upper element of said mount and said protruding member; and
  (ii) at least said second portion of said protruding member, said one or more reliefs being positioned one of in or on a perimeter of said at least said second portion of said protruding member and said one or more reliefs operating to reduce physical contact between one or more surfaces of said protruding member and one or more surfaces of said upper element of said mount, thereby one of reducing or eliminating transfer of one or more stresses between said upper element of said mount and said protruding member.

18. The method of mounting an optical structure as recited in claim 17, wherein said one or more reliefs are formed such that: (i) said one or more reliefs extend a predetermined distance radially from said first opening towards an exterior of said upper element when said one or more reliefs are positioned one of in or on said perimeter of said first opening; and (ii) said one or more reliefs extend a predetermined distance radially from said at least second portion of said protruding member towards an interior of said protruding member when said one or more reliefs are positioned one of in or on said perimeter of said at least said second portion of said protruding member.

19. The method of mounting an optical structure as recited in claim 1, wherein said first portion of said protruding member has a surface that is in contact with said surface of said optical structure and said groove is spaced away from said optical structure such that said groove is disposed at a location along said protruding member that is at a predetermined distance from said surface of said first portion.

* * * * *